(12) United States Patent
Meppelink et al.

(10) Patent No.: US 6,437,664 B1
(45) Date of Patent: Aug. 20, 2002

(54) MULTIPLE FILTER

(75) Inventors: Jan Meppelink, Soest; Jörg Kühle, Welver-Borgeln; Frank Wallmeier, Lippstadt; Meinolf Dingenotto, Schloss Holte, all of (DE)

(73) Assignee: Filtec Filtertechnologie Fuer Die Elektronikindustrie GmbH, Lippstadt (DE)

( * ) Notice: Subject to any disclaimer, the term of this patent is extended or adjusted under 35 U.S.C. 154(b) by 50 days.

(21) Appl. No.: 09/642,330

(22) Filed: Aug. 21, 2000

(30) Foreign Application Priority Data

| Aug. 19, 1999 | (DE) | ................................ | 199 39 379 |
| Aug. 19, 1999 | (DE) | ................................ | 299 14 584 U |
| Dec. 4, 1999 | (DE) | ................................ | 199 58 484 |

(51) Int. Cl.[7] ........................ H03H 7/00; H01R 13/648; H01G 4/35
(52) U.S. Cl. ........................ 333/182; 439/607; 439/620; 361/302
(58) Field of Search ................................ 333/182, 183, 333/185, 12; 439/608, 607, 620; 361/302

(56) References Cited

U.S. PATENT DOCUMENTS

| 4,514,782 A | * | 4/1985 | Sakamoto et al. | ............ | 361/306 |
| 5,261,829 A | * | 11/1993 | Fusselman et al. | ......... | 439/108 |
| 5,635,775 A | * | 6/1997 | Colburn et al. | ................ | 307/91 |

* cited by examiner

Primary Examiner—Robert Pascal
Assistant Examiner—Stephen E. Jones
(74) Attorney, Agent, or Firm—Laurence A. Greenberg; Werner H. Stemer; Gregory L. Mayback

(57) ABSTRACT

A multiple filter for a plug connector has at least one capacitor with a signal electrode and a ground electrode connected to the associated signal and ground line, respectively, such that it can be produced using not only discrete components but also using thick-film or thin-film technology, and such that it can also be used in the frequency range above 10 GHz. A block of capacitor columns is provided, which are combined in the block or are provided free-standing on a block base. The block insulating material is formed by the capacitor dielectric with a dielectric constant of $10^3$ to $10^4$. Each capacitor column contains a capacitor which is formed by a signal conductor and a ground conductor. The signal electrode is formed either by the signal conductor itself or by layers connected thereto. The ground electrode is formed on the outer wall of the capacitor column and at least partially covers it.

65 Claims, 22 Drawing Sheets

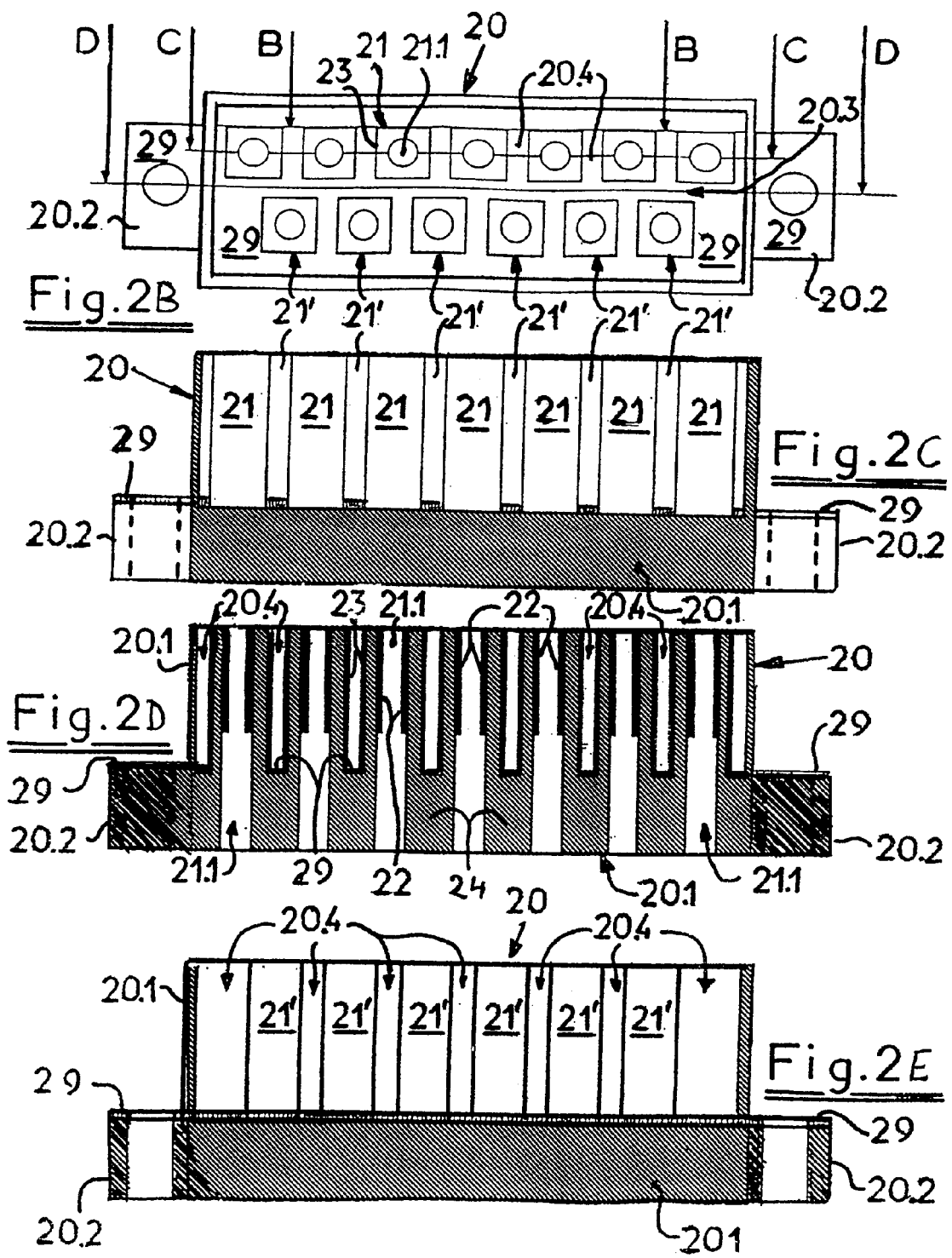

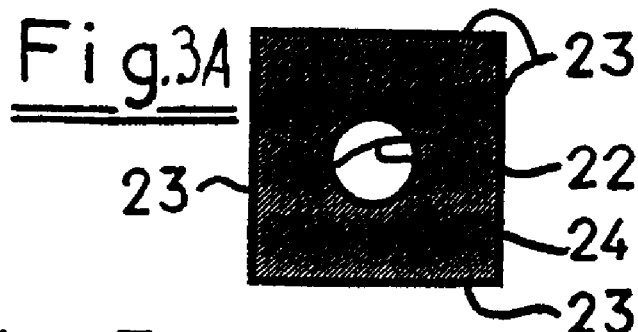
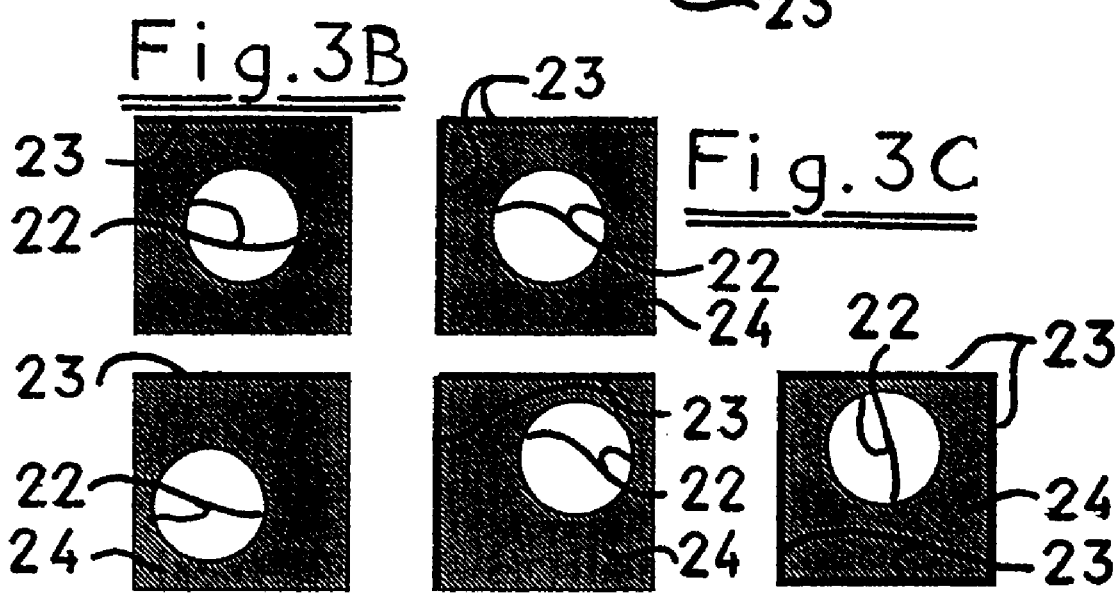

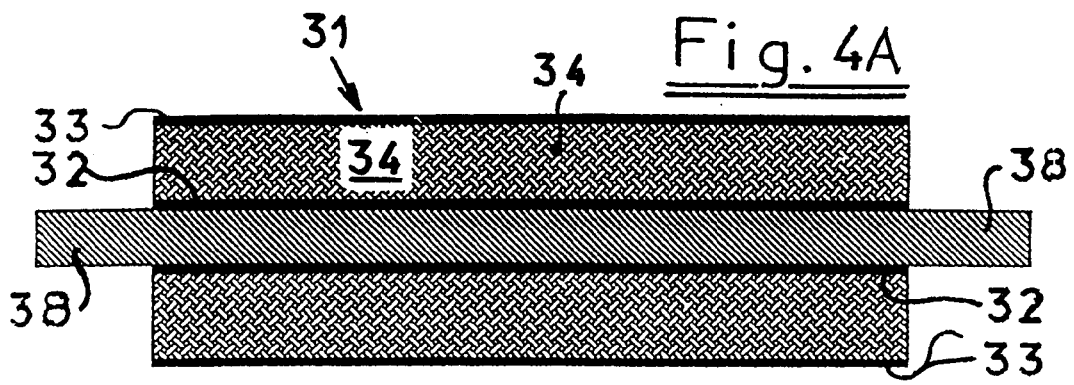
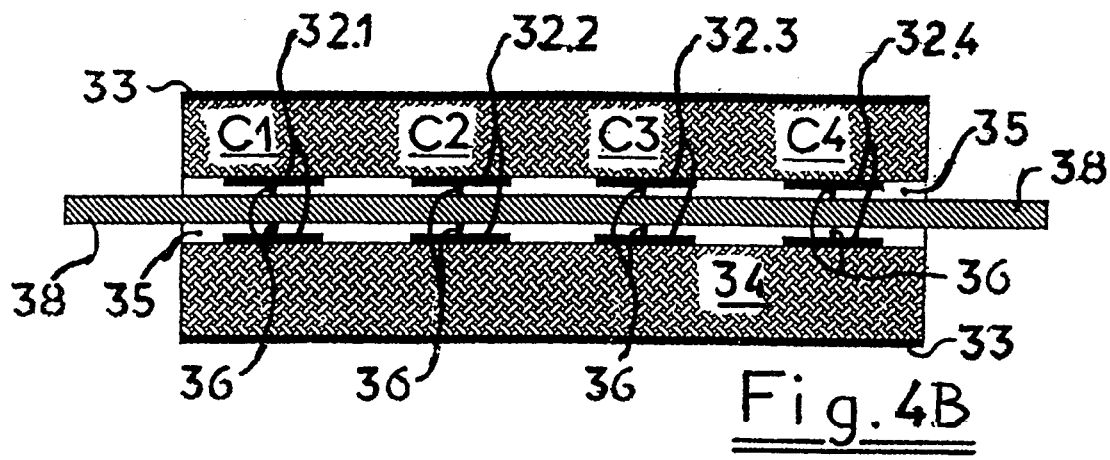
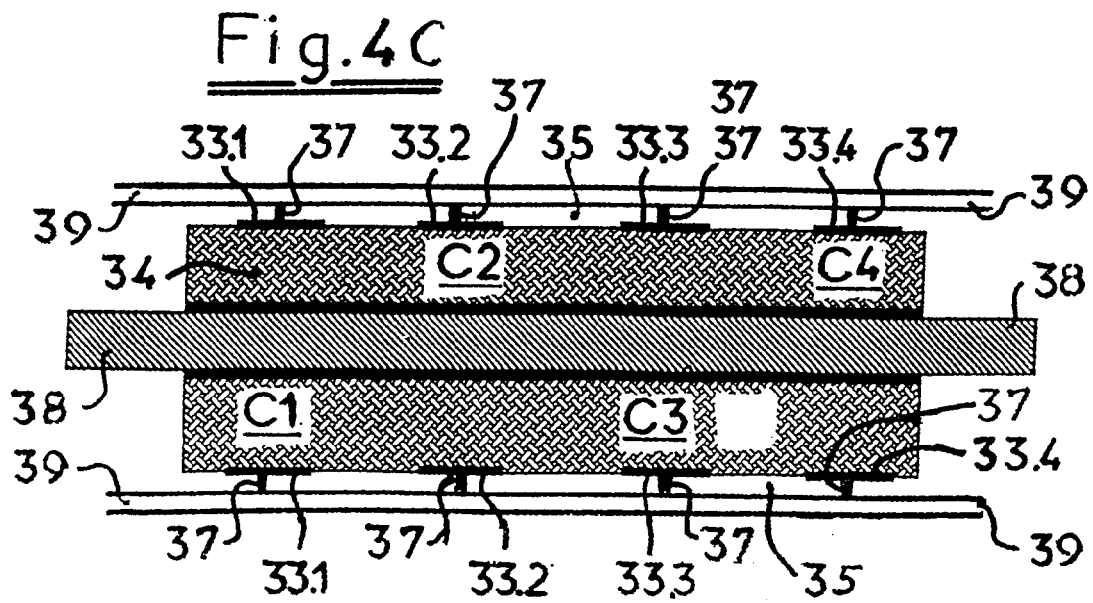

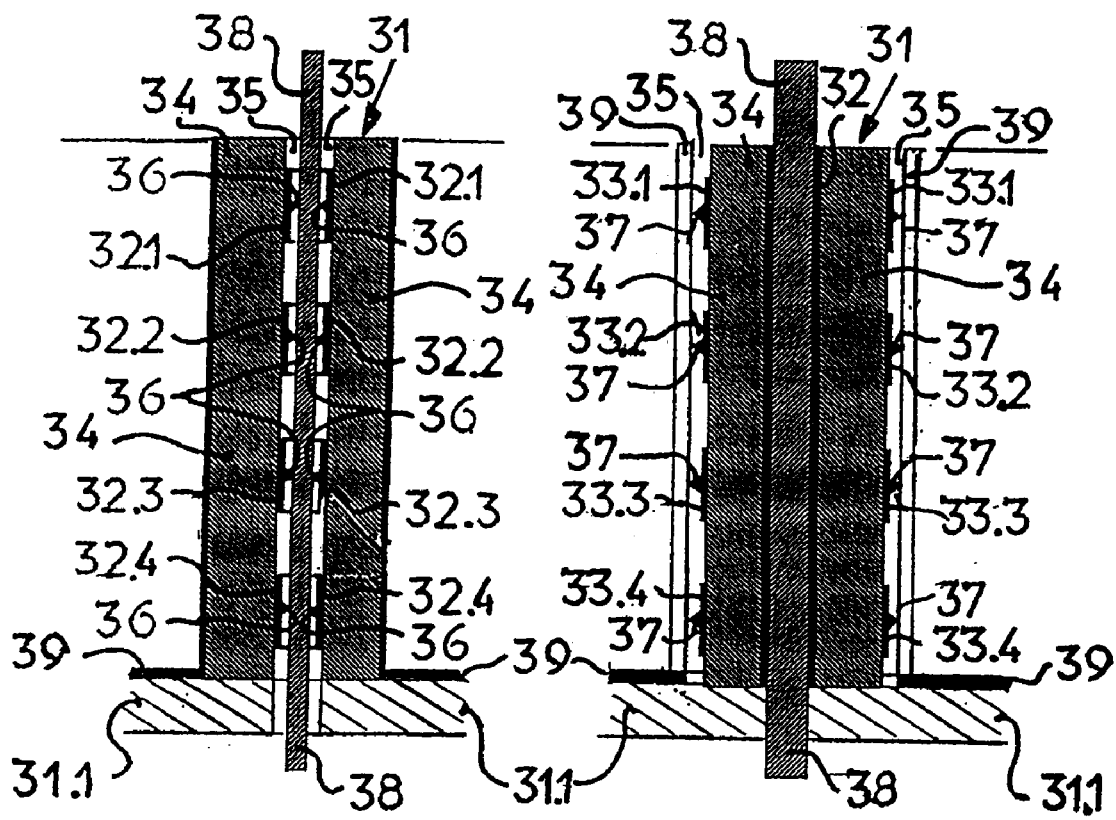

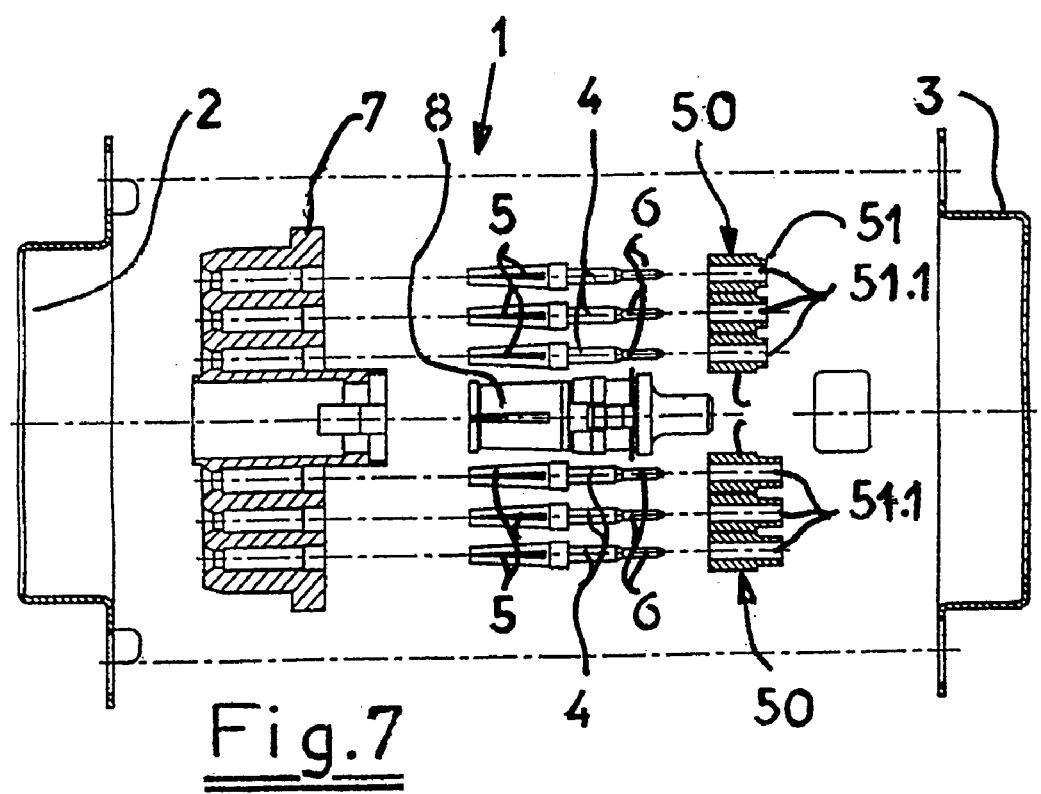

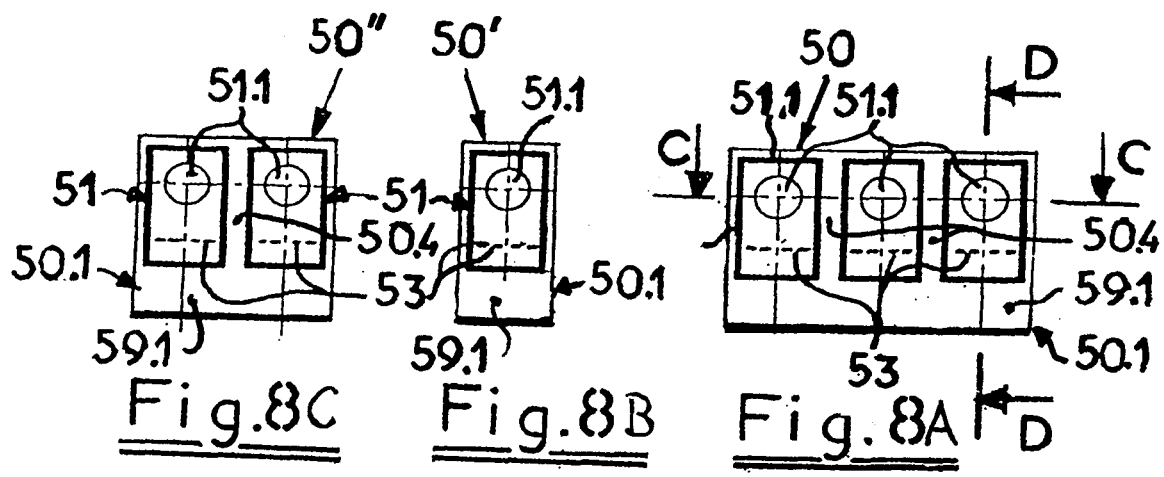

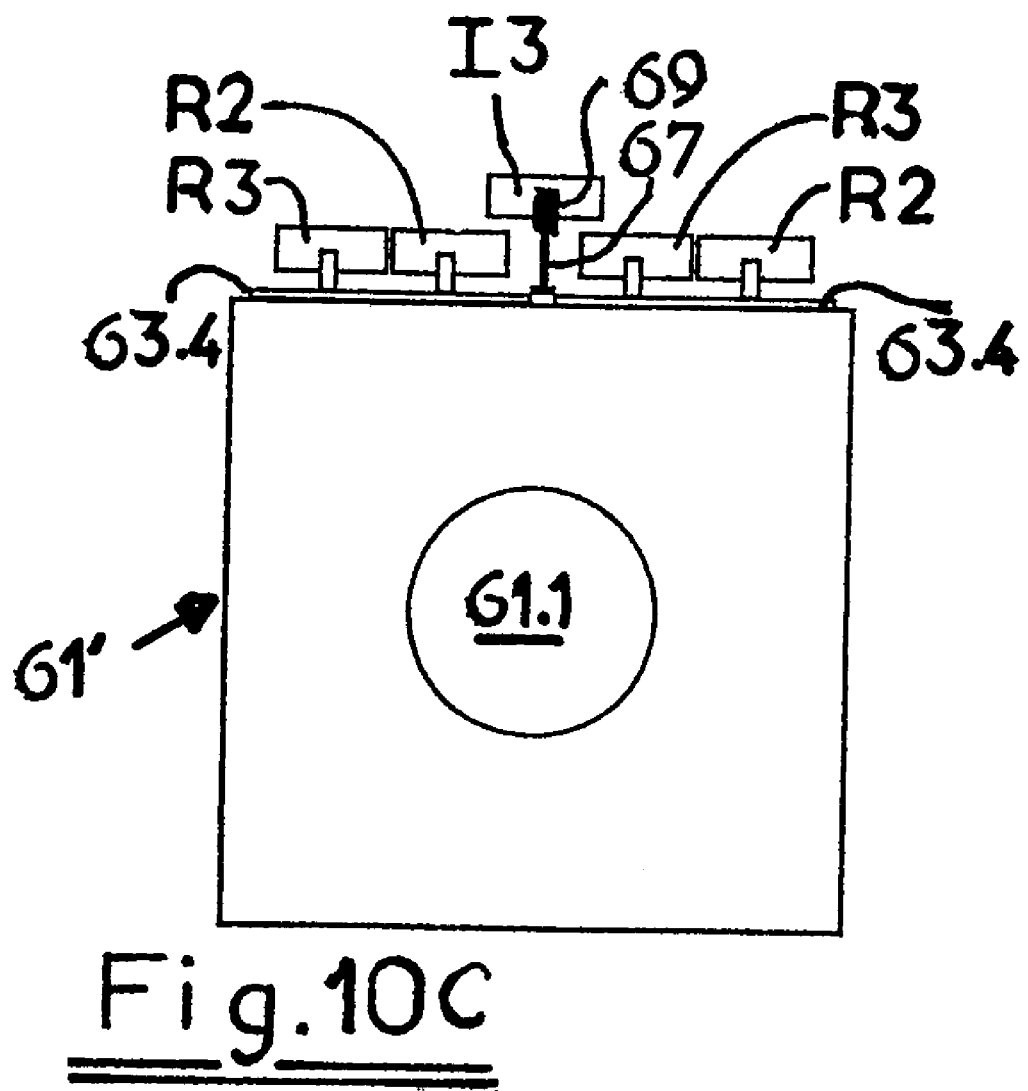

MULTIPLE FILTER

BACKGROUND OF THE INVENTION

Field of the Invention

The invention relates to a multiple filter, the use of such a multiple filter as a plug connector and to a method for producing such a multiple filter.

Multiple filters are known per se. In many cases, planar filters are used in which the capacitor electrodes are provided in a plane at right angles to the alignment of the signal conductors. As a consequence, only limited capacitances can be accommodated in the limited space on the bases of such planar filters. For larger capacitances, filters have been developed which surround the signal conductors like tubular capacitors. This makes larger electrode areas possible and larger capacitances can be achieved, which can be further increased by the use of dielectrics with dielectric constants of the order of magnitude of $10^3$ to $10^4$, for example as disclosed in U.S. Pat. No. 4,494 092, in French Patent Document FR 2 422 268 or in Published, Non-Prosecuted German Patent Applications DE-OS 26 00 320 or DE-OS 28 00 745.

SUMMARY OF THE INVENTION

It is accordingly an object of the invention to provide a multiple filter, in particular for plug connectors, which overcomes disadvantages of the heretofore-known multiple filters of this general type and which can be produced easily and economically. A preferred embodiment of the multiple filter should be usable in the frequency range of up to and above 10 GHz. The multiple filter should have the capability of not only being fitted with discrete components but also with thick or thin-film technology. The multiple filter should furthermore operate in a reliable and safe manner.

With the foregoing and other objects in view there is provided, in accordance with the invention, a first embodiment of a multiple filter, including:

a cuboid block made of an insulating material and having an exterior region;

the cuboid block being formed with a number of passages to be assigned to a corresponding number of signal conductors;

at least one capacitor being respectively assigned to each of at least some of the passages;

the at least one capacitor having a signal electrode and a ground electrode and a dielectric layer provided therebetween;

the signal electrode being electrically connected to an associated one of the signal conductors;

a ground conductor connectable to ground;

the dielectric layer including a dielectric with a dielectric constant in an order of magnitude of $10^3$ to $10^4$, the dielectric being formed of the insulating material;

the at least one capacitor being in a form of a capacitor column;

the capacitor column being provided in the cuboid block and being surrounded by the cuboid block, the capacitor column being formed with a central channel and having an outer wall, the central channel forming one of the passages;

the signal electrode of the at least one capacitor being formed in the central channel; and the ground electrode being provided in a region of the outer wall of the capacitor column, the ground electrode being a metal layer at least partially covering the outer wall and being connected to the ground conductor extending transversely to the central channel.

A second embodiment of the multiple filter includes:

a cuboid block made of an insulating material and having a base and an exterior region;

the cuboid block being formed with a number of passages to be assigned to a corresponding number of signal conductors;

capacitors being respectively assigned to each of at least some of the passages;

the capacitors each having a signal electrode and a ground electrode and a dielectric layer provided therebetween;

the signal electrode being electrically connected to an associated one of the signal conductors;

a ground conductor connectable to ground;

the dielectric layer including a dielectric with a dielectric constant in an order of magnitude of $10^3$ to $10^4$, the dielectric being formed of the insulating material;

the capacitors being in a form of capacitor columns and having feet;

the capacitor columns standing with the feet on the base of the cuboid block and being separated as islands at least by transverse grooves formed in the cuboid block;

the capacitor columns each being formed with a central channel having an inner wall, and the capacitor columns each having an outer wall, the central channel forming one of the passages;

the signal electrode being provided in a region of the inner wall; and the ground electrode being provided in a region of the outer wall, the ground electrode being a metal layer at least partially covering the outer wall and being connected to the ground conductor extending transversely to the central channel.

In accordance with another feature of the invention, a metallic coating is connected to the central channel, the metallic coating forming the signal electrode.

In accordance with yet another feature of the invention, the ground electrode is a metallization, the metallization surrounds the capacitor columns in a manner of a tube.

In accordance with a further feature of the invention, the cuboid block is formed with grooves; and shielding metal strips are introduced in at least some of the grooves and are connected to ground.

In accordance with another feature of the invention, the cuboid block is formed with grooves, the grooves have respective bases; and ground conductors are provided in the bases of the grooves.

In accordance with another feature of the invention, an associated one of the signal conductors is provided at a distance from the signal electrode and thus from the dielectric; the signal electrode is subdivided into at least two electrode elements separated in a direction of a signal propagation; and the electrode elements are electrically connected, via at least one signal connecting conductor, with the associated one of the signal conductors such that the at least one capacitor is formed from capacitor elements and includes a continuous electrode and a subdivided electrode.

In accordance with yet another feature of the invention, the at least one signal connecting conductor and the associated one of the signal conductors are connected by an essentially point-shaped connection; and a further dielectric having a further dielectric constant in a range from $10^0$ to $10^1$ is provided between the associated one of the signal conductors and the signal electrode.

In accordance with a further feature of the invention, the ground conductor is provided at a distance from the ground electrode and thus from the dielectric; the ground electrode is subdivided into at least two electrode elements separated in a direction of a signal propagation; and the electrode elements are electrically connected, via at least one ground connecting conductor, with the ground conductor such that the at least one capacitor is formed from capacitor elements and includes a continuous electrode and a subdivided electrode.

In accordance with a further feature of the invention, the ground connecting conductor and the ground conductor are connected by an essentially point-shaped connection; and a further dielectric having a further dielectric constant in a range from $10^0$ to $10^1$ is provided between the ground conductor and the ground electrode.

In accordance with another feature of the-invention, the ground conductor is a metallized strip running parallel to the central channel, at a distance from the dielectric having a dielectric constant in a range from $10^3$ to $10^4$.

In accordance with yet another feature of the invention, the further dielectric is provided as a spacer between the metallization and the dieletric.

In accordance with another feature of the invention, electronic components connect the subdivided and mutually insulated electrode elements in series.

In accordance with another feature of the invention, the electronic components are resistance elements with resistance values in a range of a characteristic impedance of the associated one of the signal conductors interacting with the dielectric.

In accordance with yet another feature of the invention, the resistance elements are ohmic resistance elements.

In accordance with another feature of the invention, the electronic components are resistance elements with resistance values in a range of a characteristic impedance of the ground conductor interacting with the dielectric.

In accordance with a further feature of the invention, soldered SMD components are provided as resistors for connecting adjacent ones of the electrode elements in series.

In accordance with a further feature of the invention, applied strips of resistance paste connect adjacent ones of the electrode elements in series.

In accordance with yet another feature of the invention, resistance strips are applied with planar technology, the resistance strips connecting adjacent ones of the electrode elements in series.

In accordance with a further feature of the invention, an inductance is connected to the signal conductor and/or the ground conductor.

In accordance with another feature of the invention, the signal electrode and/or the ground electrode is subdivided into electrode elements, an inductance is connected between two successive ones of the electrode elements, the inductance is in a range of from 1 to 10 $\mu$H and is selected from the group consisting of SMD coils, ferrite beads, and ferrite layers.

In accordance with a further feature of the invention, at least one of the ground conductor, the dielectric, the further dielectric, the signal conductors, electrode elements, a resistance, and an inductance is a layer applied as a screen-printed layer for forming a planar filter structure.

In accordance with another feature of the invention, a plurality of capacitor columns is provided in a row and grouped as one of single columns, double columns, triple columns, and multiple columns for forming plug connector inserts, the capacitor columns having respective central channels for the associated signal conductors to pass therethrough, a base for the capacitor columns corresponding to connections to be filtered, and the ground conductor being a metallic coating provided on at least part of outer walls of the capacitor columns.

The multiple filter may advantageously be used in combination with a multipole plug connector.

With the objects of the invention in view there is also provided a method for producing a multiple filter according to the invention, the method includes the steps of:

providing a cuboid block made of an insulating material;

providing capacitors having a dielectric with a dielectric constant in an order of magnitude of $10^3$ to $10^4$, the capacitors being in a form of capacitor columns and having central channels;

applying signal electrode elements and/or ground electrode elements by applying and burning a metallization paste in strips on outer surfaces of the capacitor columns;

applying a layer of a further dielectric having a further dielectric constant in a range from $10^0$ to $10^1$ over the signal electrode elements and/or the ground electrode elements; and providing the layer of the further dielectric with centrally located apertures and passing connecting conductors therethrough for connecting the signal electrode elements to a signal conductor and the ground electrode elements to a ground conductor.

In accordance with another mode of the invention, a screen-printing process is used for the steps of applying the metallization paste and/or applying the further dielectric.

In accordance with another mode of the invention, the layer of the further dielectric is provided with further apertures in a region of at least two successive electrode elements; and resistance strips are applied on the layer of the further dielectric for connecting the further apertures.

In accordance with another mode of the invention, ground conductor strips and/or resistance strips are applied as on-edge metal strips; a solder paste is introduced into the apertures and a subsequent soldering is performed for producing an electrical connection to respective ones of the ground electrode elements and the signal electrode elements, wherein the electrical connection passes through the apertures.

In accordance with another mode of the invention, the signal conductor and/or the ground conductor are provided with ferritic coverings between connecting points of the connecting conductors.

In accordance with another mode of the invention, a ferritic paste is applied to the signal conductor and/or the ground conductor by using a screen-printing process.

In plug connectors, the contacts to be connected (in the following text referred to as signal conductors) are provided in rows. A multiple filter which can be installed in the plug connector must therefore have a configuration corresponding to this contact pattern. One embodiment of the multiple filter according to the invention is formed by capacitors provided in rows and columns, which are joined together to form a block; each has a channel for the associated signal conductor to pass through as well as a ground conductor for connection to a ground point, if necessary via bridging conductors which join the ground conductors of the capacitors.

Each of the capacitors is in the form of a capacitor column with a central channel for the associated signal line to pass through, with the dielectric material forming the block which contains the individual capacitors. Metal coatings on the insides of the central channels, which are electrically connected to the signal lines passing through, form signal electrodes of the capacitors, and metal coatings on the outsides of the capacitor columns form the ground electrodes. When high dielectric strength material with a low dielectric constant is used, sufficiently high capacitances can be achieved, which still allow effective filtering, but whose capacitance has a low temperature and frequency response. If, on the other hand, a material with a high dielectric constant is used, individual capacitors with extremely high capacitance values can be achieved. A number of such capacitor columns corresponding to the hole pattern of the plug connector are combined to form a block, so that its plug pattern corresponds to that of a corresponding plug connector. In this case, different capacitor columns can be joined and different conductor connectors may also be used, for example coaxial contacts and/or power-current contacts in addition to signal contacts. For production purposes, the dielectric body is advantageously produced using the injection-molding method or using a method similar to centrifugal casting from an appropriate ceramic slip, in which case fine structures can be produced in particular with the method that is similar to centrifugal casting.

In the first embodiment, the joined capacitor columns form a cuboid block. Each of the capacitor columns is provided with a central channel for the signal conductor to pass through, with the inner wall of the central channel being metallized to form the signal electrode. At a distance from this, this signal electrode is surrounded by a metallized coating which forms the ground electrode, with the dielectric layer being provided between the two to maintain the spacing. The ground electrodes of the individual capacitors are advantageously fed out via one or more bridge electrodes for metallization of the end surface, and are connected to the general ground. The totally metallized end surface or else—in the case of filters provided in series—metallized strips running on the end face form the ground connection (it is self-evident that the areas between the ground electrodes and the signal electrodes are excluded from metallization). This embodiment forms a compact block of assembled capacitors, which can be introduced as such directly into a circuit. Such structures can be produced on the basis of extruded hollow tubes, through whose central channel the signal conductor is passed, and whose outside is metallized. These are joined—depending on the desired quantity and configuration—to form a block and are then sintered, if required with the interposition of a dielectric having a low dielectric constant. The sintered block is machined to size and is contacted, the individual signal conductors are inserted into the central channels, and either themselves form the signal electrode resting on the dielectric or are connected, in the central channel, to the internal metallized areas in the central channels, which form the coatings of the signal electrode. Capacitance matching can in this case be carried out by cutting the capacitor columns or their metallic outer coatings to length; alternatively, the inner coatings can also be cut to length, although an air gap must then be provided between the dielectric and the signal conductor, to allow this type of capacitance matching. If the signal electrode and/or the ground electrode are offset with respect to the end surface, the dielectric strength can be further increased.

In this first embodiment, the block of the multiple filter can be configured to be so compact that the central channel with the signal conductor and the ground dissipation conductor, which is connected to the equipment ground via the ground conductor, can become conductor tracks which are applied onto dielectric layers. The metallized end faces of the base (or its metallized surface areas) are then available as a ground connection.

In a second embodiment, the individual capacitors are separated from one another like islands through the use of mutually crossing grooves in the dielectric block, so that a column structure is produced which is provided in a trough and in which each of the columns is a capacitor column whose foot is anchored in the block. Significant decoupling between the individual capacitors is in this case achieved just by these air gaps. Each capacitor column contains a central channel for the signal conductor, which forms the signal electrode or which is connected to the inner channel wall which is metallized to form the signal electrode, and an outer coating which is provided on the outside and forms the ground electrode of the associated capacitor, which is connected to the connecting points via a bridge electrode or bridge electrodes provided in the base of the grooves, as already described. In this case, the insides of the side walls of the trough are advantageously metallized, and the bridge electrode passes via this metallization with the ground connecting point or points provided on the outside of the block.

In this second embodiment, the block of the multiple capacitor can also be configured such that wall areas which surround the capacitor columns standing on the base do not extend to the height of the columns, ending flush with them. In fact, the heights of these wall areas can be lower than the capacitor columns, or they may be entirely omitted with the capacitor columns standing freely on the base. The metallized end faces of the base (or its metallized surface areas) are then available as a ground connection.

The capacitance trimming can be achieved either by varying the column height or by trimming the area of the metallized coating of the signal or ground electrode. This area trimming is advantageously achieved by laser removal using a laser trimming apparatus so that, in this configuration as well, the individual capacitances of each of the capacitors can be set to a desired, tightly-toleranced value. All four sides of the columns are advantageously metallized, thus shielding the individual capacitors from one another, completely decoupling them, suppressing undesirable crosstalk and, because of the shielding against electrical fields, improving the pulse immunity to EMP somewhat. A printable palladium-silver suspension is for example used in a manner known per se for metallization, which remains as a metallic coating on the surface during sintering of the green body produced by injection molding or centrifugal casting, and this coating can be soldered in order to produce the electrical connection.

Alternatively, the metallization in particular of the outer coatings is applied after sintering, for example by printing with subsequent heating, through the use of electroplating technology or through the use of metallic coating in a vacuum, through the use of plasma or the like. The capacitor columns are advantageously not metallized on all sides, or the ground electrodes offset from the end face in order to increase the dielectric strength. Metal strips, introduced into the grooves between the columns, allow improved shielding, although the coupling capacitances in this capacitor system are intrinsically low. Crosstalk phenomena or interference signal scatter are suppressed. In order to improve the mechanical robustness, it is advantageous to encapsulate the ceramic block subdivided in this way with a plastic having a low dielectric constant. In consequence, the crossing grooves are filled, and the electrical characteristics remain essentially unchanged owing to the low dielectric constant. Such filter bodies with capacitors associated with at least a number of signal conductors, constructed in particular with dielectrics having a high dielectric constant of more than $10^3$ have operational limits, however, owing to unavoidable delay-time effects, these limits become apparent where such delay-time time effects prevent simultaneous charging of the capacitor. This is due to the fact that, because of the extent of the capacitor electrodes in the direction of signal propagation running directly on a medium of high dielectric constant in the range $10^3$ to $10^4$, the propagation speed of the signal on the conductor is reduced, and the charging and discharging of the capacitors cannot follow the oscillations in this case.

This raises the more far-reaching problem of extending such a delay-time governed limit to higher and very high frequency ranges in order to extend the applicability in terms of frequency range. In order to achieve this, a development of the invention proposes that each of the signal conductors or the ground conductor or conductors run at a distance from the coatings, so that the high dielectric constant of the capacitor dielectric can no longer have any influence on these conductors; relatively small gaps with a low dielectric constant are generally sufficient for this purpose. Signal or ground conductors thus do not run on the dielectric of the capacitors having a high dielectric constant, but in a medium with a dielectric constant in the region of $10^0$. The signal propagation speed corresponds to that in air and may thus be regarded as being "undelayed", for which purpose relatively small gap widths with a low dielectric constant are generally sufficient.

To this end, that signal electrode of the capacitor which is connected to the signal conductor or that ground electrode of the capacitor which is connected to the ground conductor is subdivided into electrode elements which are electrically individually connected to the signal conductor or the ground conductor and are at a distance from the dielectric having a high dielectric constant. Since they are at a distance from the dielectric constant of the order of magnitude of $10^3$ to $10^4$, the signal propagation speed is not reduced, and undisturbed charging and discharging of the capacitors can take place at frequencies of 1 GHz or more. In order to subdivide the signal electrode into electrode elements, it is sufficient if the diameter of the signal conductor is less than the diameter of the central channel and the signal electrodes are configured as rings fitted onto the wall of the central channel and insulated from one another, with each ring being connected to the signal conductor independently of the others. A dielectric with a dielectric constant in the region of $10^0$ is provided to maintain the spacing in the space between the signal conductor and the wall. In order to subdivide the ground electrode, it is fitted in strips onto the outside of the capacitor column; each strip is connected to a ground conductor, which is provided at a distance from the dielectric and the space in between can be filled, in order to maintain the spacing, with a dielectric having a dielectric constant in the region of $10^0$. Since the signals propagate without any disturbance on the signal or ground conductor provided at a distance from the dielectric, the signal voltages are applied (virtually) simultaneously to the connecting conductor associated with a capacitor element; the individual electrode elements are thus charged and discharged (virtually) simultaneously. This "simultaneity" suppresses delay-time differences and shifts their disturbing influence area to higher frequencies. Each of the connecting conductors is advantageously connected roughly at a point to the associated signal or ground conductor, to be precise centrally with respect to the associated capacitor element, in which case "centrally" relates to the center of the electrode element lying in the propagation direction of the signals. This defines the charge state of the conductor which brings about the "virtually" simultaneous charging and discharging of the subdivided capacitor.

In order to keep the ground conductor at a distance from the dielectric in the one embodiment, the ground conductor for each of the capacitor columns is laid as a conductive strip parallel to the central channel at a distance from the dielectric, with a dielectric having a dielectric constant in the region of $10^0$ forming the intermediate layer. With this configuration and in the case of hole patterns having two rows, it is advantageous to lay the ground electrodes on the outsides. For three-row and multi-row hole patterns, the mutually facing sides of the capacitor columns in the inner rows are provided with the ground conductor; since, as a rule, the central channels in such configurations have a gap, the ground conductor can also be accommodated as a web standing on edge.

In order to match their electrical characteristics, the mutually insulated electrode elements are connected via electronic components like a series circuit, for example via resistors which are advantageously in the form of SMD components, varistors or the like. Pure, non-reactive resistors are preferably provided as the resistance elements. Since the propagation speed of the signals on the signal or ground conductor depends on the dielectric constant of the material surrounding this conductor, and discontinuities are formed in signal-carrying conductors when resistors are connected, the resistance values of these resistors should be in the region of the characteristic impedance of the signal or ground conductor which is interacting with a dielectric having a high dielectric constant, thus resulting in the connection-dependent discontinuities being kept low. These components are soldered to two adjacent electrode elements, and electrically connect these adjacent electrode elements to one another. Varistors are also suitable for voltage limiting, in particular to achieve peak-voltage limiting for shock loads, in which case the value of the limit voltage can be achieved by selection of the varistor or of the material which acts like a varistor. Alternatively, strips of a resistance paste, preferably applied by screen-printing methods, can be provided, which connect two adjacent conductor areas to one another in the same way and are thus provided in the area between the subdivided coatings.

Apart from purely ohmic (non-reactive) resistors, inductive elements can also be provided for connection of signal or ground conductors, and in consequence also provide an inductive component. To this end, the signal conductor or the ground conductor or ground dissipation conductor is connected to at least one inductance, for which purpose SMD coils may be provided, or else, alternatively, strips, beads or rings composed of a ferritic material on the signal or ground conductor, since their reaction increases the self-induction of the signal conductor or ground conductor in the area of such strips or rings to an extent which depends on the geometry and the material; this increase can thus be matched to the requirements by selection of these parameters. These inductances are advantageously provided between at least some of the connecting points of the connecting conductors of two successive electrode elements in the subdivided signal or ground electrodes. This configuration results in filters having parallel-connected parallel-path capacitors, which are connected via series-path inductances. The filter characteristics of such configurations can be matched to the requirement by selection of the ring material and/or of the capacitors. Furthermore, it is also possible to introduce inductive components—for example SMD coils—in the free-running signal or ground conductor, and these are then connected in series with the signal or ground connection. Such inductances are preferably provided between the connecting points of the connecting conductors of two successive electrode elements of signal or ground electrodes which are subdivided into individual electrode elements. Thus, by interaction with these series-path inductances and by interaction with the parallel-connected parallel-path capacitors, this results in filters whose filter characteristics can be matched to the requirement by selection of the ring material and/or of the capacitors. Furthermore, it is also possible to introduce inductive components—for example SMD coils—in the free-running signal or earth conductor, which are then connected in series with the signal or ground connection.

Such a multiple filter is advantageously provided with external metallization which on the one hand forms a shield against interference signals, and on the other hand is also configured such that it forms the housing of the filter plug, whose interior is formed by the multiple filter. This metallization in this case also forms the mating contact for the ground connection supplied (or to be dissipated) via a connecting plug.

In order to produce such a filter with subdivided ground electrodes, these are applied in strips onto the dielectric, and this can be done, for example, using the screen-printing method. A further layer composed of a dielectric having a low dielectric constant is applied over the ground electrode, but this has holes in the middle. The ground conductor is now applied to this dielectric layer, at a distance from the dielectric having a high dielectric constant, for passing through the holes, and is conductively connected to the ground electrodes.

This ground conductor is advantageously applied as longitudinally running strips parallel to the axis, for example once again through the use of the screen-printing method; if larger cross sections are required, these strips may also be in the form of conductors standing on edge. This configuration results in the side areas of the electrode elements remaining free and being available for electrical components between the electrode elements. In this configuration, the electrode elements follow one another in the propagation direction of the signal. Although the propagation of the charge on them is delayed owing to the direct contact with a dielectric having a high dielectric constant, the individual electrode elements of each capacitor are charged and discharged (virtually) simultaneously, since the ground conductor (or the signal conductor with the, appropriate configuration) is located in a region with a low dielectric constant, and the signal propagation speed thus (virtually) corresponds to the signal propagation speed in a vacuum.

Since the electrode elements are connected virtually at a point to the ground conductor, delay-time differences may at most arise in charge propagation on the electrode elements, but not in the area of the capacitor overall.

These resistors which match the electrical characteristics are produced as resistance paste applied in strips and are advantageously provided close to the edge, and thus symmetrically about the central ground conductor. They are applied to an insulating layer which is applied, for example using the screen-printing method, to the metallized areas of the capacitor elements connected to the ground conductor. The insulating layer contains a cutout for each of the electrode elements, via which contact is made with the resistance strips, whose resistance values should in this case be in the region of the characteristic impedance of the signal or ground conductor which is interacting with the dielectric having a high dielectric constant. This configuration results in connection-dependent discontinuities being kept small. Other components may also be provided, for example layers with a varistor-like behavior. The inductances which increase the inductance of the ground conductor are applied in layers, as ferritic materials, between the connecting holes to the electrode elements: this application process is also advantageously carried out using the screen-printing method. These ferritic layers increase the series-path inductances of the ground conductor section; together with the two associated capacitor elements as parallel-path capacitors, each of these sections then form Pi filters, whose parameters are established via the capacitor capacitances and the magnitude of the series-path inductances between them. It is self-evident that the meaning of what has been said with regard to the ground conductor also applies to the signal conductor, which is then connected to signal electrodes which have been subdivided into electrode elements, separated from the dielectric having a high dielectric constant. It is also self-evident that structures as have been described here with reference to thick-film technology can also be produced by photolithographic methods and application of corresponding layers in the manner known from production of thin-film technology components.

Due to their block-like structure, such multiple filters can be introduced directly into plug connectors, so that multipole filter plug connectors are available which can be used up to high frequency ranges, can be produced economically and are reliable in operation. If these multiple filters are matched to the dimensions of mating plug connectors, and are provided with external ground connections—for example by external metallization—they may themselves be used as filter plugs.

Other features which are considered as characteristic for the invention are set forth in the appended claims.

Although the invention is illustrated and described herein as embodied in a multiple filter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2B is a diagrammatic plan view of the multiple filter of FIG. 2A;

FIG. 2C is a sectional view of the multiple filter of FIG. 2B along section line B—B;

FIG. 2D is a sectional view of the multiple filter of FIG. 2B along section line C—C;

FIG. 2E is a sectional view of the multiple filter of FIG. 2B along section line D—D;

FIG. 3A is a diagrammatic sectional view of a capacitor column of embodiment II with a centrally disposed central channel and metallized sides;

FIG. 3B is a diagrammatic sectional view of a capacitor column of embodiment II with a centrally disposed central channel and one metallized side;

FIG. 3C is a diagrammatic sectional view of a capacitor column of embodiment II with a centrally disposed central channel and two metallized sides;

FIG. 3D is a diagrammatic sectional view of a capacitor column of embodiment II with an eccentrically disposed central channel and one metallized side;

FIG. 3E is a diagrammatic sectional view of a capacitor column of embodiment II with an eccentrically disposed central channel and two metallized sides;

FIG. 3F is a diagrammatic sectional view of a capacitor column of embodiment II with an eccentrically disposed central channel and four metallized sides;

FIG. 4A is a diagrammatic sectional view of a column capacitor, in particular a simple tubular capacitor;

FIG. 4B is a diagrammatic sectional view of a tubular capacitor with a subdivided signal electrode;

FIG. 4C is a diagrammatic sectional view of a tubular capacitor with a subdivided ground electrode;

FIG. 4F is a diagrammatic sectional view of capacitor column with a subdivided signal electrode;

FIG. 4G is a diagrammatic sectional view of capacitor column with a subdivided ground electrode;

FIG. 7 is a diagrammatic exploded view of a plug connector with coaxial connections and signal connections, the latter with filter inserts;

FIG. 8A is a diagrammatic plan view of a triple capacitor column for a plug connector in accordance with FIG. 7;

FIG. 8B is a diagrammatic plan view of a single capacitor column;

FIG. 8C is a diagrammatic plan view of a double capacitor column;

FIG. 10C a diagrammatic end face view of a capacitor column with a subdivided ground electrode, with discrete components and with series-path inductances (longitudinal inductances) in the ground conductor;

DESCRIPTION OF THE PREFERRED EMBODIMENTS

Figure 1A:
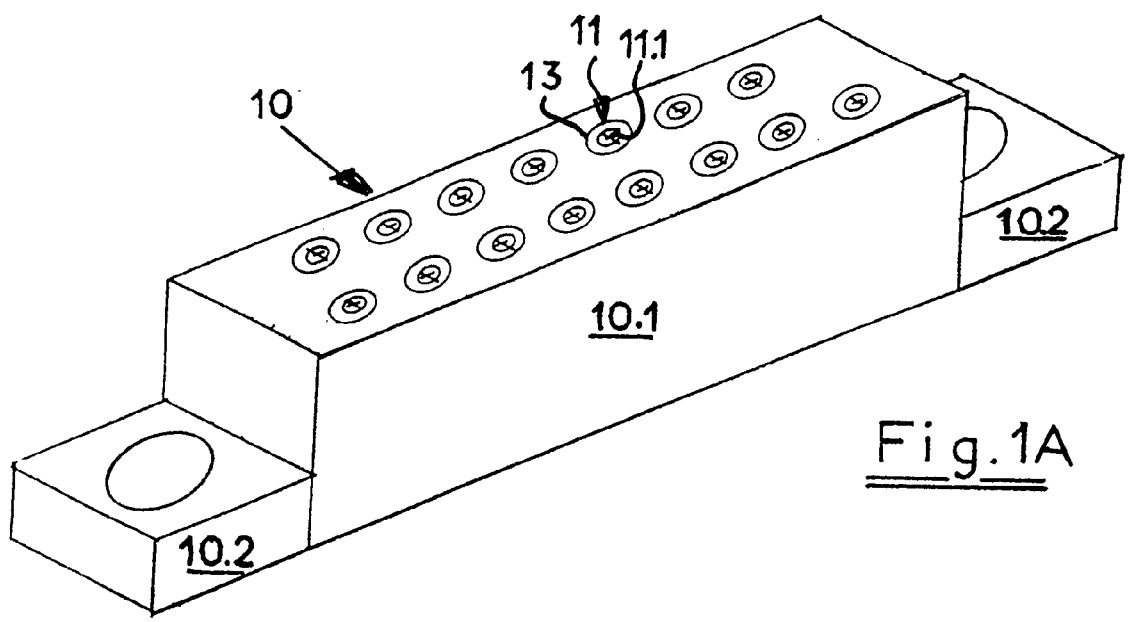
FIG. 1A is a diagrammatic perspective view of embodiment I of a 9-pin multiple filter.
Figure 2A:
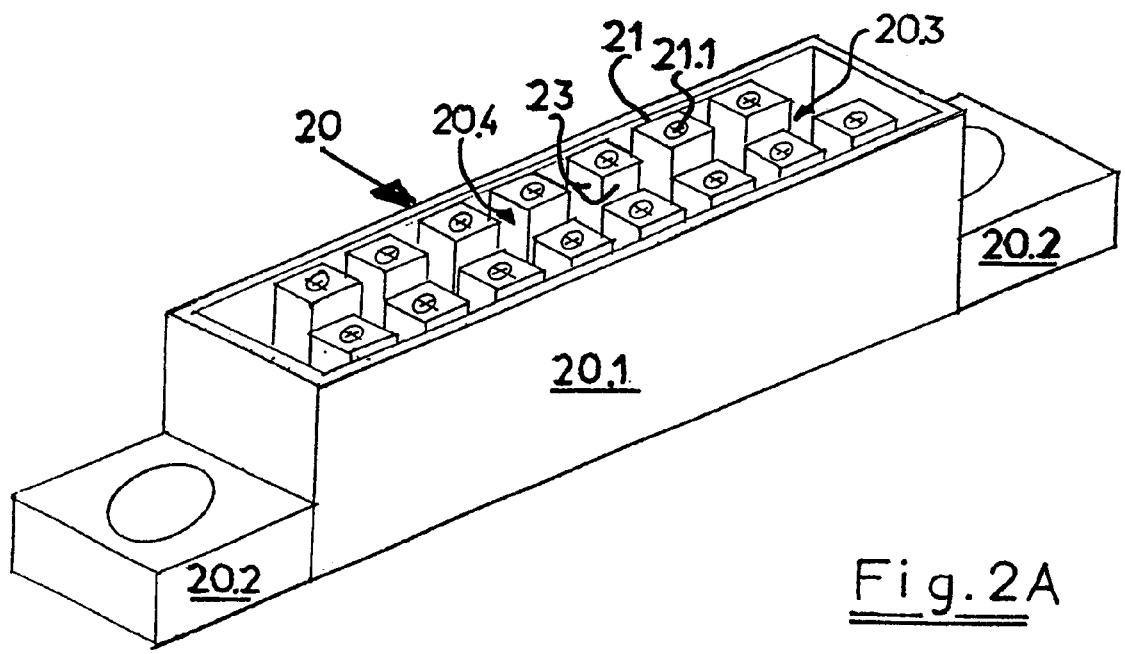
FIG. 2A is a diagrammatic perspective view of embodiment II of a 9-pin multiple filter.
Figure 1B:
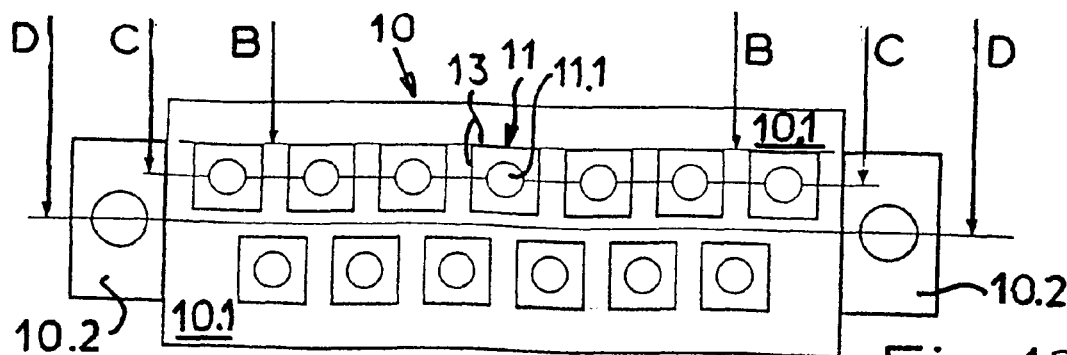
FIG. 1B is a diagrammatic plan view of the multiple filter of FIG. 1A.
Figure 1C:
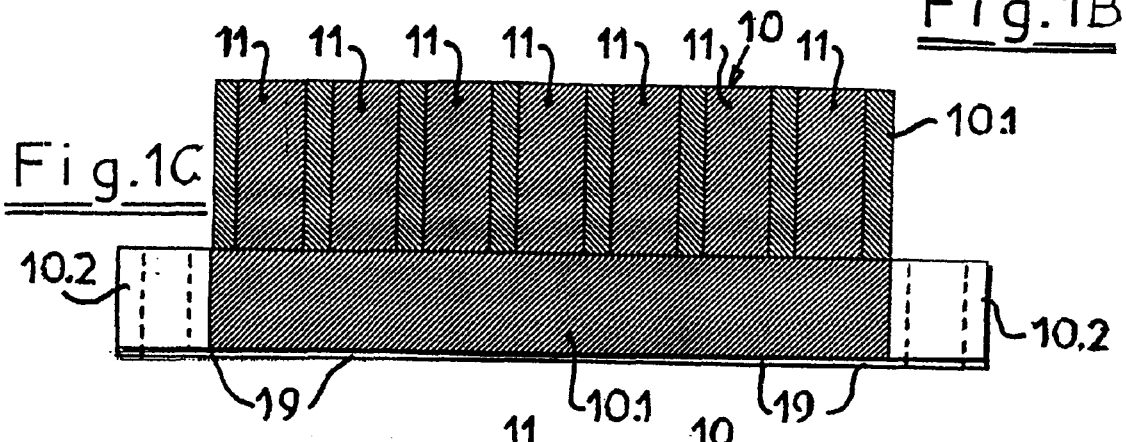
FIG. 1C is a sectional view of the multiple filter of FIG. 1B along section line B—B.
Figure 1D:
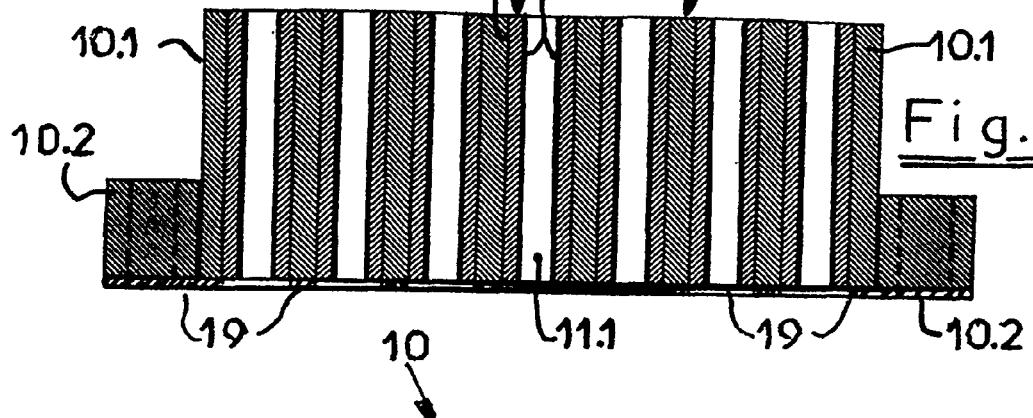
FIG. 1D is a sectional view of the multiple filter of FIG. 1B along section line C—C.
Figure 1E:
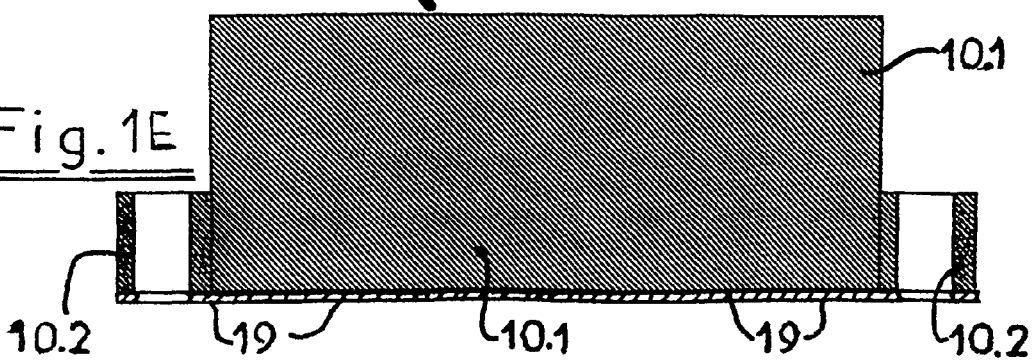
FIG. 1E is a sectional view of the multiple filter of FIG. 1B along section line D—D.

Referring now to the figures of the drawings in detail and first, particularly, to FIGS. 1A–1E thereof, there is shown a a first embodiment of such a multiple filter 10 having a block 10.1 which is formed from an insulating material and in which the individual capacitor columns 11 are provided in regular patterns. This block 10.1 is provided with mounting tabs 10.2 which allow it to be firmly screwed to a base. The capacitor columns 11—irrespective of whether they have a round (FIG. 1A) or a square cross section (FIGS. 1B–1E)—are in this case provided in rows and columns, their quantity and configuration depending on the requirement for the signal conductors to be connected. In this case, both the columns and the rows may have more than the total of 9 connections shown in FIG. 1A, in which case the connections in the columns may be either aligned or else, as shown, offset with respect to the connections in the adjacent rows. Each of the capacitor columns 11—to assist clarity in FIGS. 1A–E only one of the capacitor columns 11, whose construction is in principle identical, is in each case marked with a reference symbol—is provided with a central channel 11.1 for the signal conductor. Its inner surface is entirely, or at least partially, provided with a metallization as a signal electrode 12, which is surrounded by the dielectric 14, which generally has a dielectric constant of more than $10^3$. The ground electrode 13 is provided at a distance from the signal electrode 12 and acts as an opposing electrode, while, together with the dielectric 14, determining the capacitance of the respective capacitor. A ground dissipation conductor 19 (shown in bold to make it easier to identify) is provided transversely with respect to the extents of the capacitor columns 11, and electrically connected to the ground electrodes 13, and is provided with the metal coating 19.1 forming the ground connection, (in this case under) the block 10.1 and, pressed against metal layers that are at ground during the attachment process, produces the connection between the ground electrodes 13 and the general ground, the equipment ground. This ground connecting point is advantageously integrated in the device for mounting the multiple filter 10 on the plug connector or board of a circuit, which is preferably in the form of a mounting eye 10.2. It is thus possible to produce the ground connection with a reliable electrical contact being made, since the connecting point is pushed onto the corresponding mating contact point on the plug connector or on its housing during the mounting process. In order to produce these structures, the individual capacitor columns 10 are produced in a manner similar to the production of spaghetti, are joined together to form a pack, and are combined with an insulating material having a suitable constant to form the block 10.1. In order to give the block 10.1 the desired characteristics, the insulating material is matched to respective requirements with regard to its mechanical strength or a low dielectric constant.

FIGS. 2A–2E show these relationships using an exemplary embodiment of a second embodiment. In this case, there are longitudinal and transverse grooves 20.3, 20.4 through the block 20.1. The capacitor columns 21, which are quadrilateral in cross section, are separated from one another (which does not preclude round cross sections); the filter columns 21' in the rear row can be seen through the transverse grooves 20.4. Each of the capacitor columns 21—to assist clarity once again, only one of the capacitor columns 21, whose construction is in principle identical, is in each case provided with a reference symbol in FIGS. 2A–2E—stands with its foot on a base which is formed by the inside of the cutout block 20.1 and onto which the ground dissipation conductor 29 is applied, and which continues as metallization at least over the insides of the outer end faces of the block 20.1. This produces the electrical connection between the metallization, which acts as the ground electrode 23, and the ground connection on the mounting tabs 20.2, to which the ground dissipation line 29 leads. A metallization on all four insides of the edge walls of the block 20.1 improves the shielding (and leads to the embodiment in which the outsides are also metallized, and which then forms the filter plug overall). In this case, the metallized surfaces interact, for example, with spring contacts on the mating connectors, thus producing the ground connection. Once again, each capacitor column 21 has a central channel 21.1 for the signal conductor (not shown in any more detail here), with the capacitor column 21 itself forming the dielectric 24 having a high dielectric constant. A signal electrode is indicated with reference numeral 22. The ground electrodes 23 are formed by the metallization on the outer side surfaces of each capacitor column 21. In this case—as described above—the ground connecting point may also at the same time be in the form of mounting eyes 20.2 for the filter 20 on the plug connector which, apart from mounting, also allows a reliable ground connection. FIGS. 3A–3F show possible configurations of this metallization 23, which can be provided on one side, two sides, three sides or else four sides. In this case, the central channel 21 may be provided centrally or eccentrically in the dielectric 24 having a high dielectric constant.

Figure 4D:
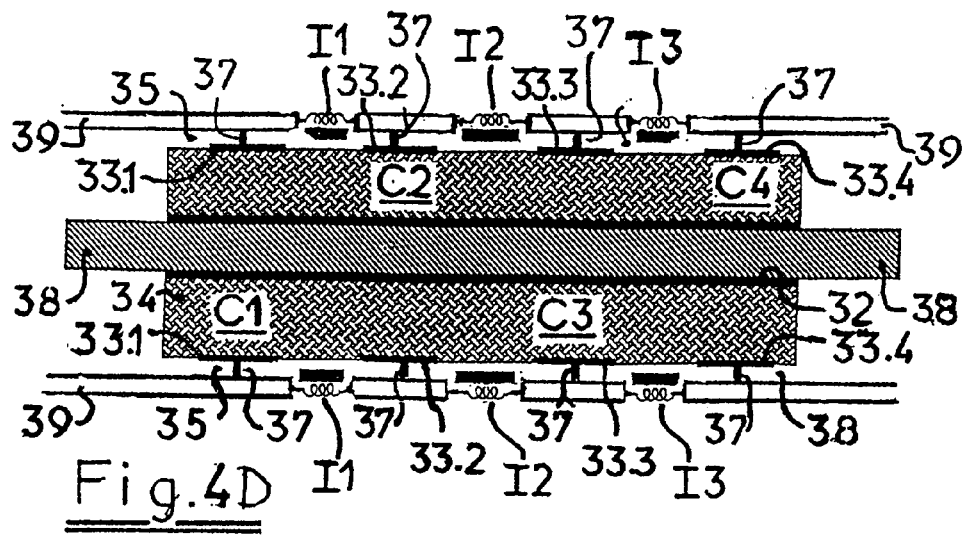
FIG. 4D is a diagrammatic sectional view of a tubular capacitor with a subdivided ground electrode and a series-path inductance (longitudinal inductance)

To assist understanding, FIGS. 4A–4G show schematically the change from a tubular capacitor 31 (FIG. 4A) to a delay-time-corrected tubular capacitor in which one of the electrodes of the capacitor (FIG. 4B: signal electrode 32; FIG. 4C: ground electrode 33) is subdivided into electrode elements C1, C2, C3 and C4 which are connected like a series circuit via the signal conductor (FIG. 4B) or the ground conductor (FIG. 4C), respectively. FIG. 4D shows the configuration as shown in FIG. 4C, but with series-path inductances (longitudinal inductances). The signals propagate according to FIGS. 4A–4G on the configuration formed by the signal conductor 38 and ground conductor 39 at a propagation speed which corresponds roughly to that that this conductor configuration would have in a vacuum. If the signal were to propagate along the tubular capacitor shown in FIG. 4A with its dielectric 34, the propagation speed of the signal would be reduced as a function of the dielectric constant of this dielectric 34. This reduction is a consequence of the change in the characteristic impedance Z, which depends on the dielectric constant. It follows from this that the charging and discharging of the electrodes is "smeared", which leads to the capacitor being highly frequency dependent. In order to counteract this "smearing" of the charging and discharging process (or to shift the cut-off frequency of use to higher frequencies), one of the capacitor electrodes is subdivided into electrode elements. FIG. 4B shows the electrode elements of the signal electrodes 32.1, 32.2, 32.3 and 32.4, and FIG. 4C shows the electrode elements of the ground electrode 33.1, 33.2, 33.3 and 33.4. In this case, the signal conductor 38 (FIG. 4B) or the ground conductor 39 (FIG. 4C), respectively, runs in an environment where the dielectric constant is low and corresponds (virtually) to a vacuum, which is indicated here by air, but this does not preclude the use of an insulating material with a dielectric constant close to $10^0$, in which case a material layer can furthermore be used for mechanical robustness. Here, the propagation speed of the signal on the conductor corresponds approximately to that in a vacuum.

Since the individual electrode elements 32.1, 32.2, 32.3 and 32.4 or 33.1, 33.2, 33.3 and 33.4, respectively, are connected to the corresponding conductor 38 or 39, respectively, via the connecting conductor for the signal 36 or ground 37, respectively, the capacitor elements C1, C2, C3 and C4 are thus charged and discharged without any delay, and this is also transferred to the opposing electrode due to the influence interaction or electrostatic induction. This allows the electrode elements 32.1, 32.2, 32.3 and 32.4 or 33.1, 33.2, 33.3 and 33.4, respectively, of the capacitor elements and thus the capacitors overall as well to be charged and discharged without any delay, thus allowing a higher cut-off frequency. In FIG. 4D, the ground conductor 39 is additionally loaded with the series-path inductances I1, I2 and I3 which, through the use of ferritic layers—not shown in any more detail—are provided between the connecting points of the connecting conductors for ground 37. These series-path inductances I1, I2 and I3 are thus located such that, together with the capacitor elements C1, C2, C3 and C4 they form Pi filters, and thus govern the overall filter effect of the configuration.

Figure 4E:
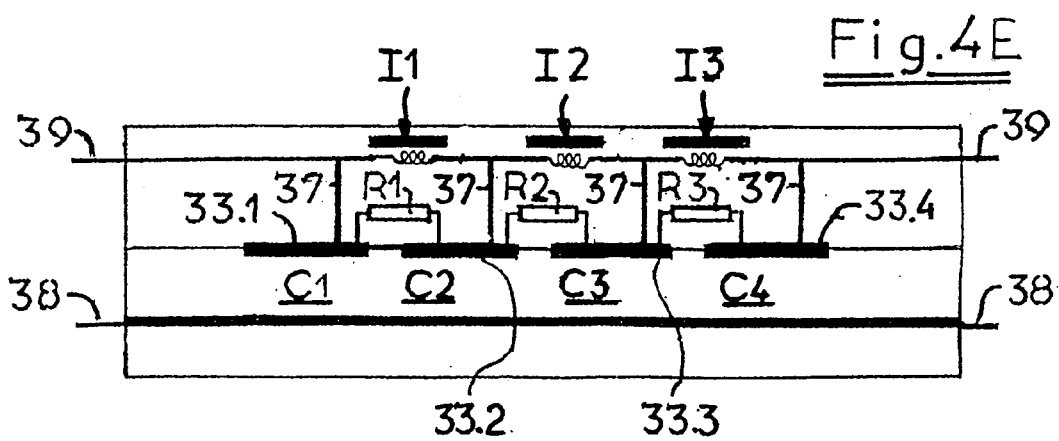
FIG. 4E is an equivalent circuit diagram of the tubular capacitor shown in FIG. 4D.
Figure 5B:
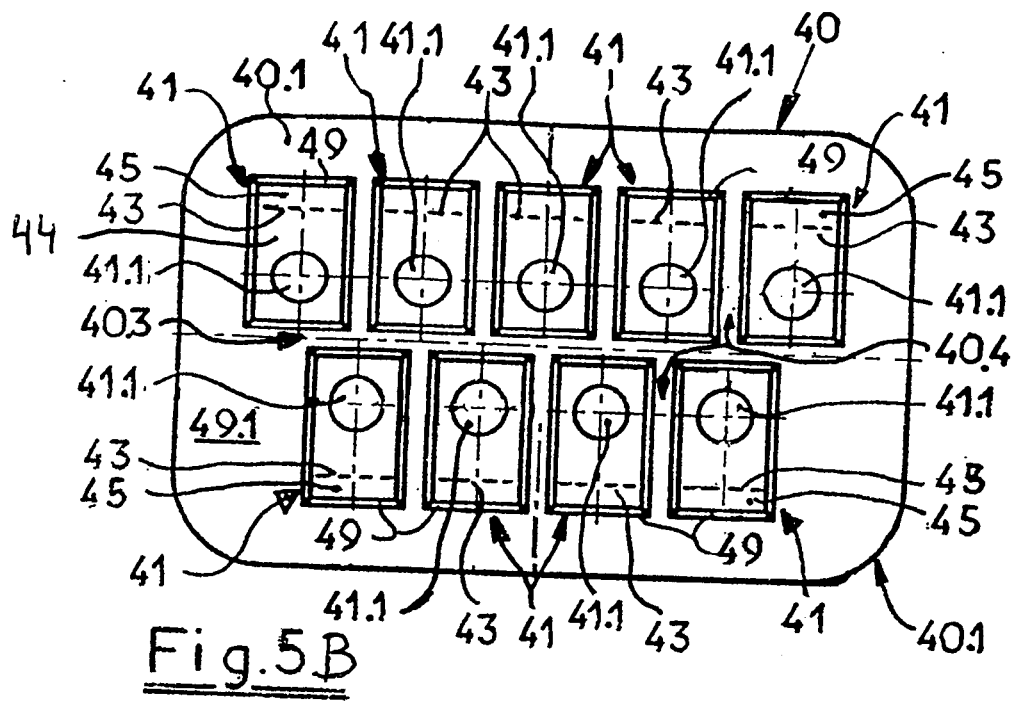
FIG. 5B is a diagrammatic plan view of a filter insert for a sub-D 9-pin plug connector.
Figure 5A:
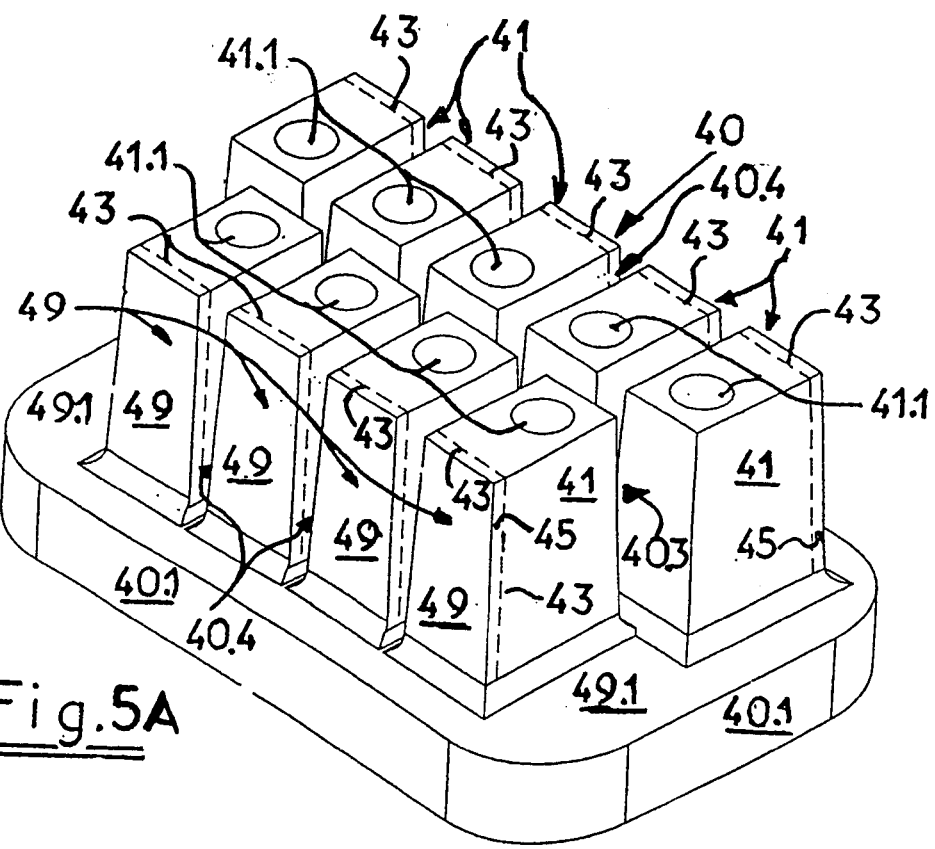
FIG. 5A is a diagrammatic perspective view of a filter insert for a sub-D 9-pin plug connector.
Figure 6B:
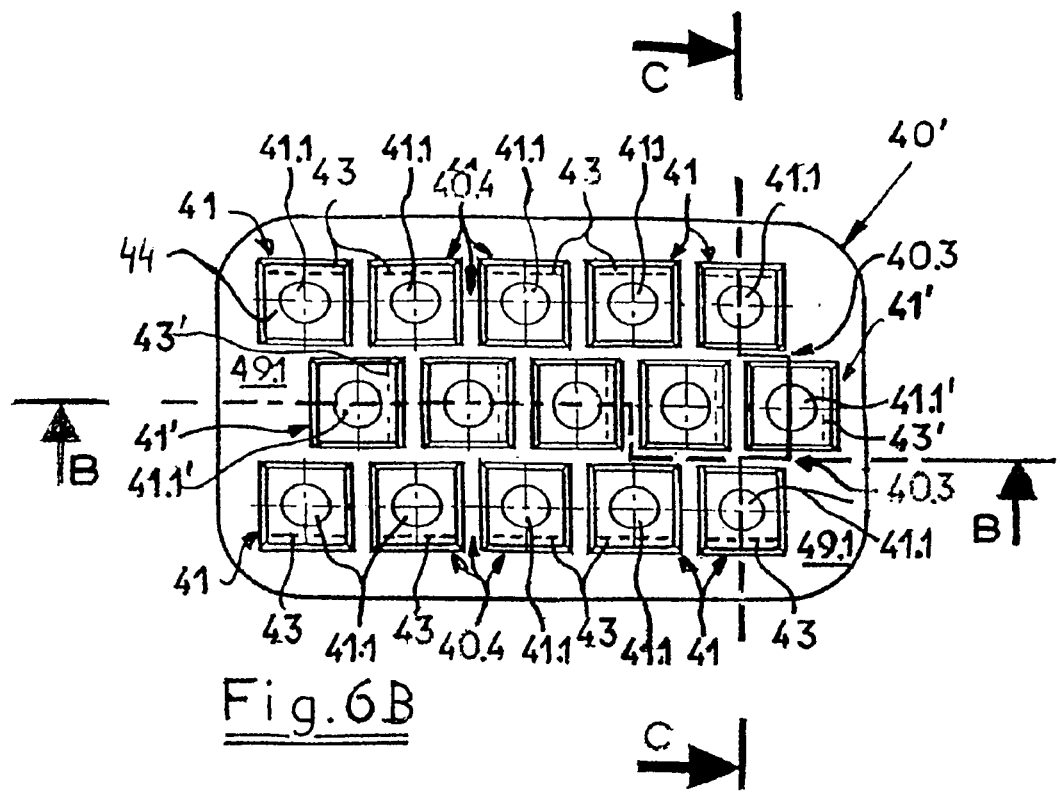
FIG. 6B is a diagrammatic plan view of a filter insert for a sub-D 9-pin plug connector.
Figure 6A:
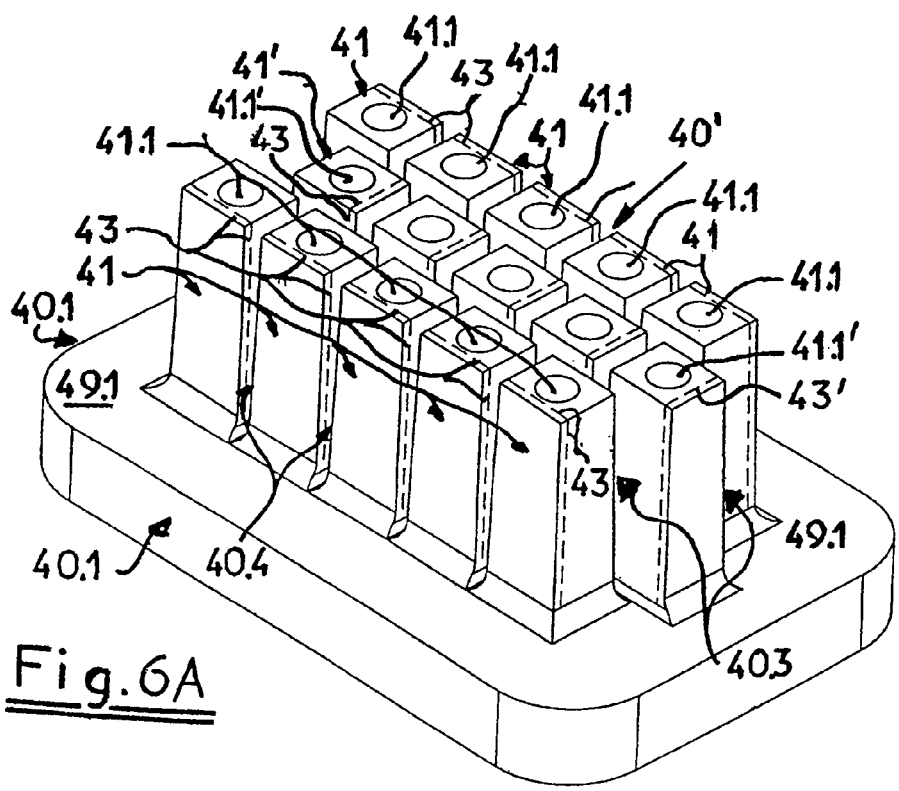
FIG. 6A is diagrammatic perspective view of a sub-D 15-pin plug connector with filter insert.
Figure 6C:
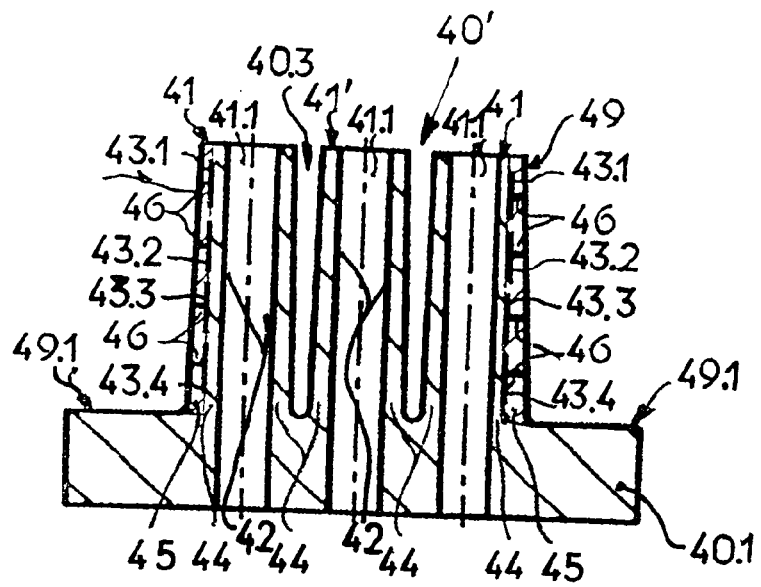
FIG. 6C is a sectional view of the sub-D 15-pin plug connector shown in FIG. 6B along section line B—B.
Figure 6D:
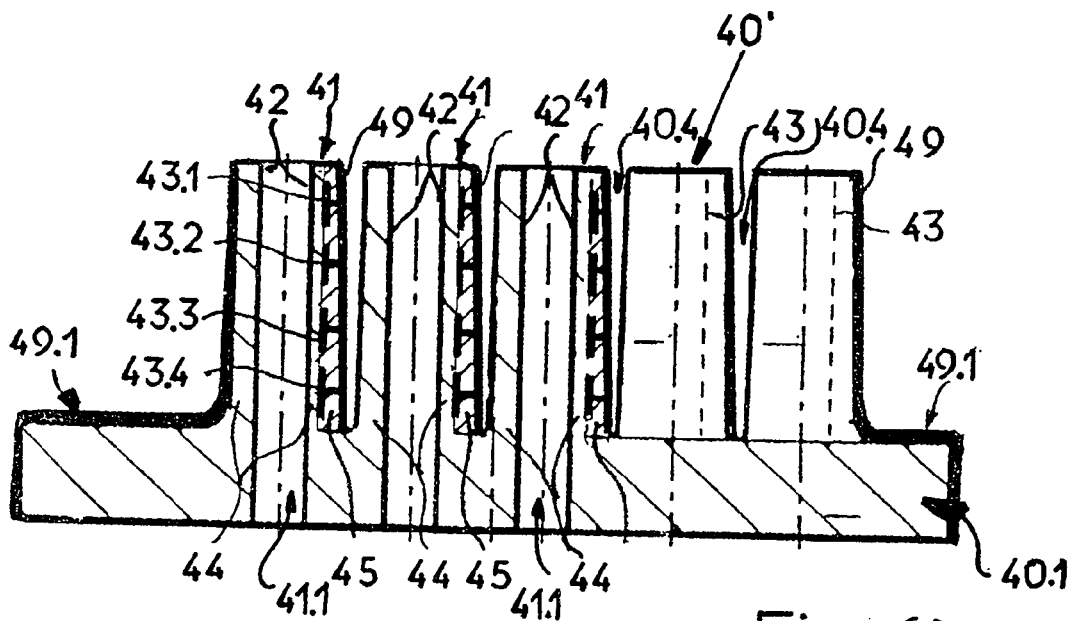
FIG. 6D is a sectional view of the sub-D 15-pin plug connector shown in FIG. 6B along section line C—C.

The equivalent circuit of a capacitor column—FIG. 4E—shows the continuous signal conductor 38, forming the signal electrode 32, and the ground electrode, which is subdivided into four electrode elements 33.1, 33.2, 33.3 and 33.4, with the signal electrode 32 and each of the electrode elements 33.1, 33.2, 33.3 and 33.4 in each case forming a capacitor element C1, C2, C3 and C4 connected in parallel, whose dielectric 34 is a layer having a high dielectric constant ($10^3$–$10^4$). The capacitance of this overall capacitor is the sum of these capacitance elements. These four electrode elements are connected via the connecting conductors 36 to the ground dissipation conductor 39 in order that the capacitor elements C1, C2, C3 and C4, and thus the overall capacitor as well, are connected to ground, acting as filter capacitors. The connecting conductors 37 and the ground dissipation conductor 39 in this case run in an area 35 where the dielectric constant is low, and thus outside the area of influence of the high dielectric constant; signals propagating on the ground conductor remain uninfluenced. The electrode elements (33.1, 33.2, 33.3 and 33.4 are coupled via resistors R1, R2 and R3. In this case, together with the electrode elements 33.1, 33.2, 33.3 and 33.4, these resistors form a series circuit. The trimming of the resistors is carried out such that the resistance corresponds to the characteristic impedance Z of the ground dissipation conductor 39 (or signal conductor 38) which interacts with a dielectric having a high dielectric constant.

Series-path inductances composed of series-path inductance elements I1, I2 and I3 are connected in the ground conductor 39 between the connecting points of the individual connecting conductors 37, these being formed by ferritic strip elements provided on the ground conductor—which are not referenced in any more detail. The permeability of the applied ferritic strip as well as the dimensions of these ferritic strips allow the magnitude of each of these series-path inductance elements I1, I2 and I3 which are introduced into the ground conductor 39 to be set appropriately for the requirements and, together with the upstream and downstream capacitor elements C1, C2, C3 and C4, they each form a Pi filter whose filter characteristics can be set in conjunction with the capacitances of the capacitor elements C1, C2, C3 and C4 and the series-path inductance elements I1, I2 and I3 such that they satisfy desired requirements. FIGS. 4F and 4G each show a capacitor column 31 having a signal electrode (FIG. 4F) or ground electrode (FIG. 4G) subdivided into electrode elements. The capacitor column, whose construction corresponds to that in FIGS. 4B and 4C, is in this case placed on the base 31.1, which can be used in an assembly in a multiple capacitor.

FIGS. 5A–5B and 6A-6D show two embodiments of a multiple filter having filter capacitors for sub-D plug connectors with 9 pins (40—FIG. 5A) or with 15 pins (40'—FIG. 6A) as is normal for a connection of peripheral appliances, for example to computers (the plug connector housing is not illustrated). The capacitor columns 41 of both are either placed on the block base 40.1 or are configured such that they can be assembled to form the block of the plug connector insert 40, with the capacitor columns being separated from one another by transverse grooves 40.4. Reference numeral 40.3, 41', 41.1', 42, and 43' respectively indicate a longitudinal groove, a capacitor column, a central channel, a signal electrode, and a ground electrode.

These embodiments can be produced to accurate tolerances and economically for electronics using ceramic molding production methods. The capacitor columns 41 are provided with central channels 41.1 through which the signal conductors are passed.

At least the capacitor columns 41 are produced from an insulating dielectric 14 having a high dielectric constant of the order of magnitude $10^3$ to $10^4$. Due to the particular conditions (described in more detail in conjunction with FIGS. 4A–4G), the delay-time phenomena described there occur in this case, and these can be suppressed by subdividing the capacitors into capacitor elements. In this case, the (embedded) ground electrode 43 is provided. Each of the electrode elements is connected via a connecting conductor 46 to the ground dissipation conductor 49, and runs in a layer 45 composed of a dielectric with a low dielectric constant, and continues on the surface of the base 40.1 as a metallic layer 49.1 (provided a dielectric layer is provided and the ground dissipation or signal conductor does not run freely in an air-filled space). The ground dissipation conductor 49 is thus at a distance from the areas of high dielectric constant, and delay-time phenomena are thus suppressed. The ground conductor 49 is, in the end, led to the exterior and thus, merging into a surface coating 49.1, allows connection to the housing of the plug connector, and thus to ground. The subdivided ground electrodes 43.1, 43.2, 43.3 and 43.4 are provided such that they are located under the outsides of the capacitor columns 41. If—as in the case of the multiple filter 40' for the 15-pin sub-D plug connector shown in FIG. 6A (with the same reference symbols as FIG. 5A so that the same description applies to this)—a center row of capacitor columns 41 is inserted in addition to the two rows of capacitor columns, the subdivided ground electrodes 43.1 . . . 43.4 are advantageously in this case provided on the sides of the capacitor columns 41 located in the center row, which follow one another in the same direction in the direction of the longitudinal extent. However, the invention is not limited to this configuration. The ground dissipation conductors 49 are in this case applied to the corresponding outsides of these central capacitor columns 41; they continue for connection to the plug connector housing (not shown) in the metallic coating 49.1 on the base 40.1. These electrode elements 43.1 . . . 43.4 are in this case embedded by the ground dissipation conductor 49 under a layer having a low dielectric constant, so that the dielectric 44 having a high dielectric constant cannot influence the signal propagation speed.

Figure 8E:
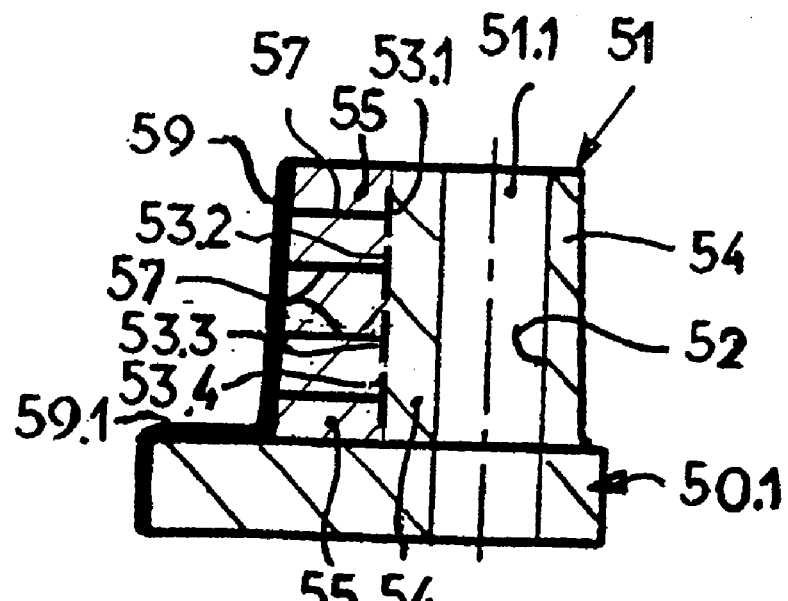
FIG. 8E is a sectional side view of a capacitor column with a subdivided ground electrode along section line D—D in FIG. 8A.
Figure 8D:
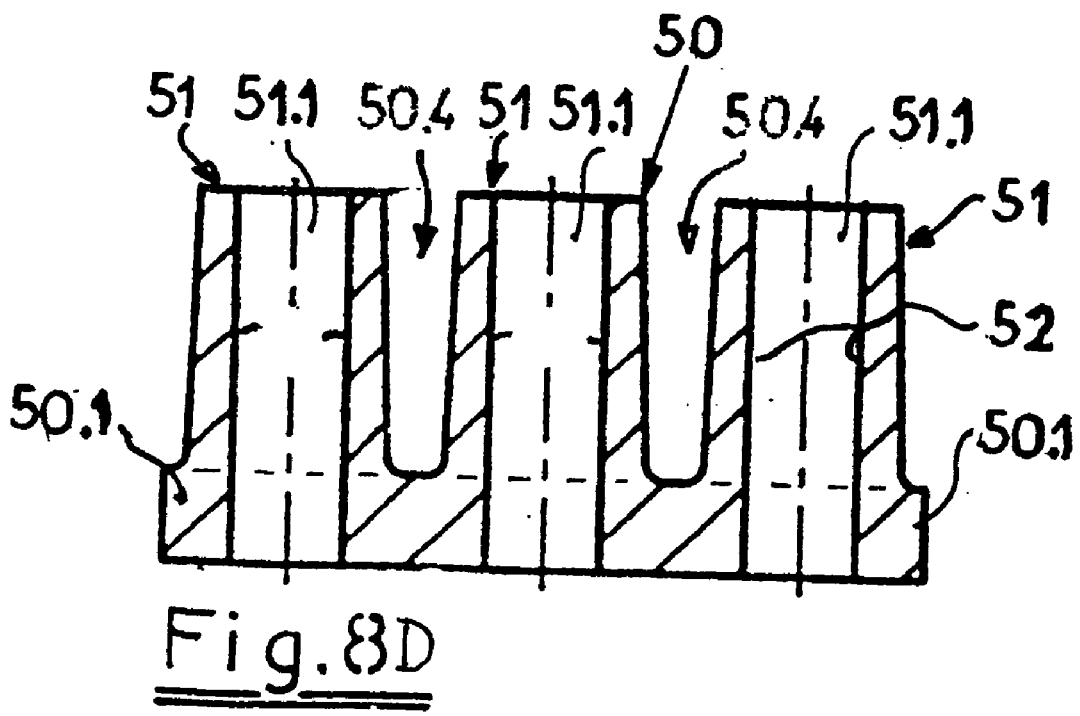
FIG. 8D is a sectional side view a triple capacitor column along section line C—C in FIG. 8A.

FIG. 7 shows a multiple filter 50 for a plug connector 1 which, apart from the normal connecting device 4 for the signal lines (not shown) has other connections in its two housing shells 2 and 3, for example power-current connections or—as shown in FIG. 7—a coaxial connection 8, with the plug ends 5 (in this case sockets) being inserted into an insulating plug receptacle 7 and their signal conductor connections 6 being passed through the capacitor columns 51 (whose construction is essentially identical) of the multiple filter 50 (details of which are shown in the FIGS. 8A–8E). Each of the multiple filters 50 (FIG. 8A—triple) or 50' (FIG. 8B—single) or 50" (FIG. 8C—double) has a number of capacitor columns 51, which are fitted to the base 50.1 and have central channels 51.1, corresponding to the number of signal lines to be filtered, with the signal conductors which form the signal electrode or are connected to it being passed through these central channels 51.1. The overall multiple filter 50 is composed of a dielectric compound of high dielectric constant, as are each of the capacitor columns 51 as well, separated by transverse grooves 50.4. The ground electrode 53, which is also subdivided, and a layer of a dielectric material 55 having a low dielectric constant is applied to at least one of the outsides of the capacitor columns 51. The ground dissipation conductor 59 is provided on this, and is electrically connected via ground connecting conductor 57 to the electrode elements. In this case, the multiple filters 50 are advantageously formed integrally with the capacitor columns 51 (although this does not preclude the filter inserts being assembled from single capacitor columns). The sectional views shown in FIGS. 8D and 8E are enlarged in comparison with the other illustrations and show the signal electrode 52 as well as the ground electrode elements 53.1, 53.2, 53.3 and 53.4, which are provided close to the inner wall of the central channel 51.1 and are connected via the connecting conductors 57 to the ground dissipation conductor 59. These electrode elements are provided in the boundary region of the dielectric compound 54, which is important for the capacitors and has a high dielectric constant, and of the dielectric layer 55 which has a low dielectric constant. The ground connecting conductors 57 are passed through this layer 55 having a low dielectric constant, and the ground conductor 59 is at a sufficient distance from the dielectric compounds having a high dielectric constant that the signal propagation speed along the ground dissipation conductor remains uninfluenced. The ground dissipation conductor 59 is continued on the base 50.1 through a metallic layer 59.1 so as to produce a connection to the shells 2 and 3, respectively, of the housing 1, which are at ground.

Figure 9A:
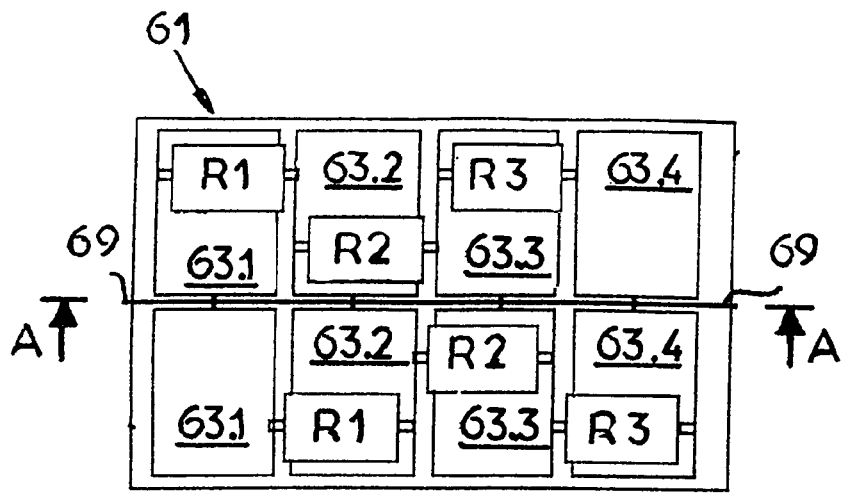
FIG. 9A is a diagrammatic plan view of a capacitor column with a subdivided ground electrode and components.
Figure 9B:
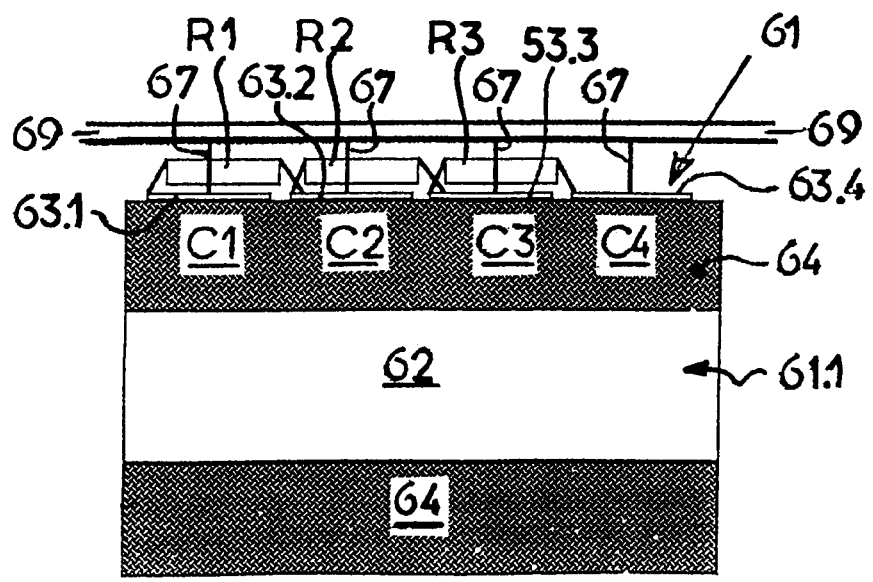
FIG. 9B is a diagrammatic sectional side view of a capacitor column with a subdivided ground electrode and components.
Figure 9C:
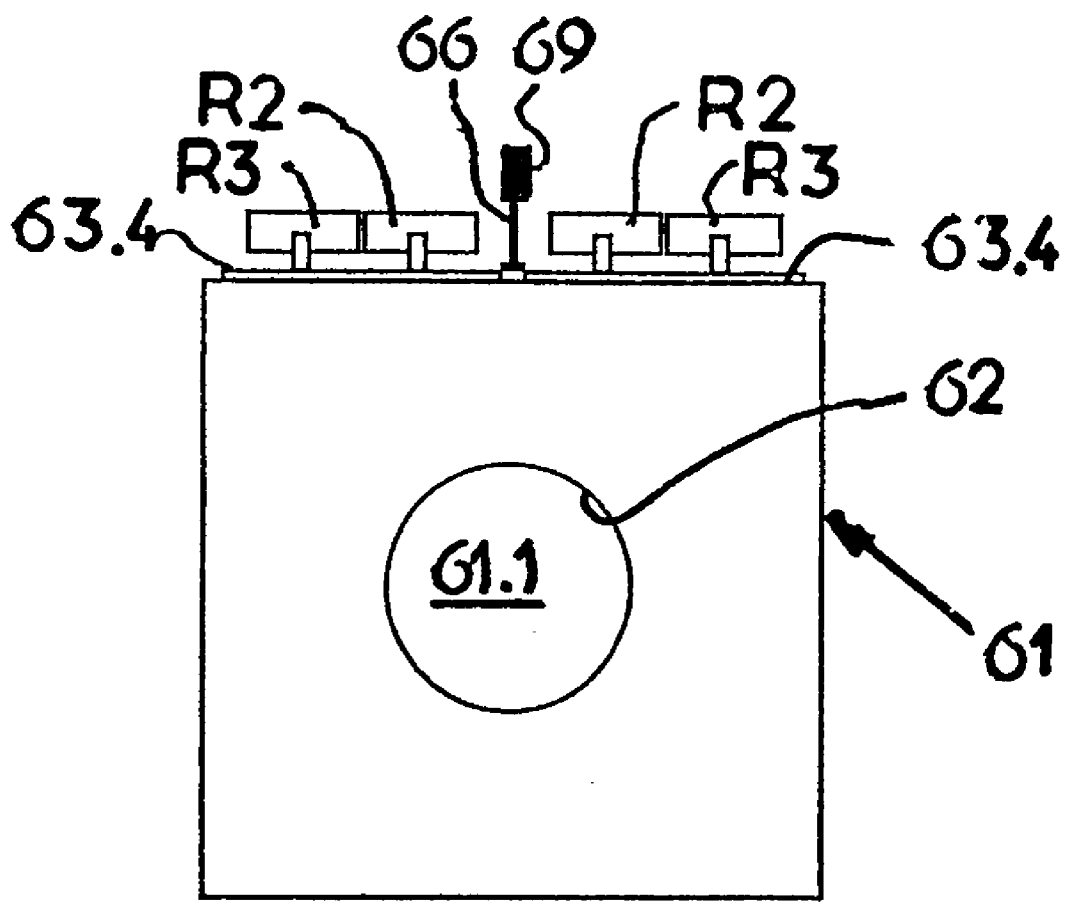
FIG. 9C is a diagrammatic end face view of a capacitor column with a subdivided ground electrode and components.

FIGS. 9A–9C show a capacitor column 61 having a subdivided ground electrode 63.1, 63.2, 63.3, 63.4, in which discrete resistor components are applied separately. FIG. 9a is a top plan view, FIG. 9B a sectional side view, and FIG. 9C is an end face view. The capacitor column 61 is composed of a dielectric 64 having a high dielectric constant in the range from $10^3$ to $10^4$ and is in turn provided with the central channel 61.1 for the signal conductor (not shown), which forms the signal electrode 62 (not subdivided), either resting (with a matching shape) against the inner wall or, with a metallization on the inner wall. The capacitor elements C1, C2, C3 and C4 are formed by this signal electrode and the electrode elements 63.1, 63.2, 63.3 and 63.4 of the ground electrode. These electrode elements are connected via the ground connecting conductors 67 to the ground dissipation conductor 69. The electrode elements 63.1, 63.2, 63.3 and 63.4 are provided such that the dielectric 64 having a high dielectric constant is located between them and the signal electrode 62 and governs the capacitance of the capacitor elements. The ground conductor 69 itself is located outside the area of high dielectric constant (here it is shown running in air, however it can also be embedded in a dielectric compound having a low dielectric constant). In consequence, signal propagation on the ground conductor is not interfered with by a high dielectric constant. The electrode elements 63.1, 63.2, 63.3 and 63.4 are in this case provided on both sides of the ground conductor 69 thus (but not necessarily) providing symmetry. The ground conductor 69 is connected to a connecting conductor 66.

Successive electrode elements are in each case connected by resistor elements R1, R2 and R3, which allow charge dissipation. In this case, the resistor element R1 connects the electrode elements 63.1 and 63.2, the resistor element R2 connects the electrode elements 63.2 and 63.3, and resistor element R3 connects the electrode elements 63.3 and 63.4. This connection is advantageously made on both sides of the ground dissipation conductor, which in turn leads to a certain amount of symmetry, which is once again not necessary. In consequence, in a side view, the resistors R2 and R3 located in the second row are partially concealed. The resistor components are in this case advantageously provided "offset" so that the solder points in the edge region of the associated electrode element do not overlap. In this case, the resistor components are advantageously offset by one electrode-element width with respect to one another on the two sides of the ground dissipation conductor 69 as well. These resistor components can be provided with solder tabs—as shown—and can thus be soldered on with a gap; they may also be directly soldered on as SMD (Surface Mounted Device) components; insulation layers must, of course, be provided in order to avoid electrical shorts.

Figure 10A:
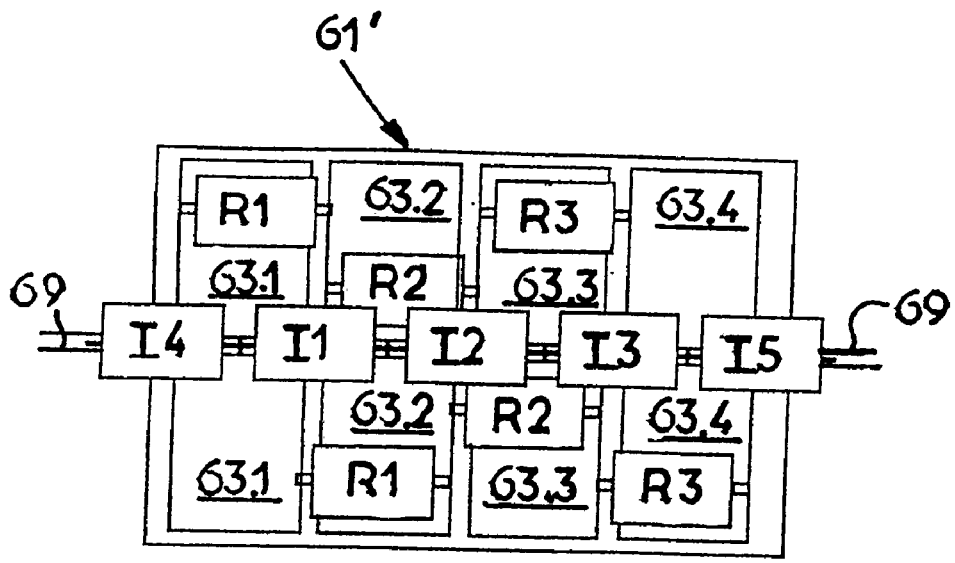
FIG. 10A is a diagrammatic top plan view of a capacitor column with a subdivided ground electrode, with discrete components and with series-path inductances (longitudinal inductances) in the ground conductor.
Figure 10B:
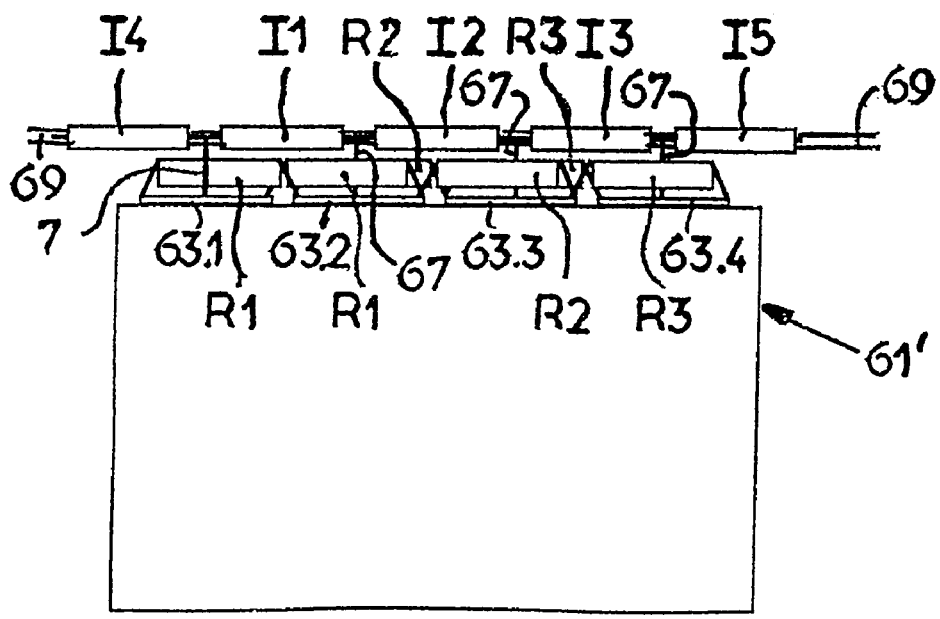
FIG. 10B is a diagrammatic side view of a capacitor column with a subdivided ground electrode, with discrete components and with series-path inductances (longitudinal inductances) in the ground conductor.

The construction of the capacitor column 61' shown in FIGS. 10A–10C corresponds to that of the capacitor column 61 (FIG. 9A) but with inductances I1, I2, I3 and I4 being coupled into the ground conductor 69. These inductances, which are shown in more detail in FIGS. 4D and 4E and are described in conjunction with those figures, allow the electrical parameters of the individual filter stages to be matched to the required or desired conditions. FIG. 10B also shows inductances I4 and I5 in the input and output of the ground dissipation conductor 69, which individually or jointly allow further adaptation options.

FIGS. 11A–11D and 12A–12E show a highly compact embodiment of the capacitor column, which is based on embodiment I and in which the ground dissipation conductor is reconfigured to form conductor tracks provided at a distance from the signal conductor (or signal contact). This allows an extremely compact type of construction, which corresponds to that of miniaturized electronic components.

Figure 11A:
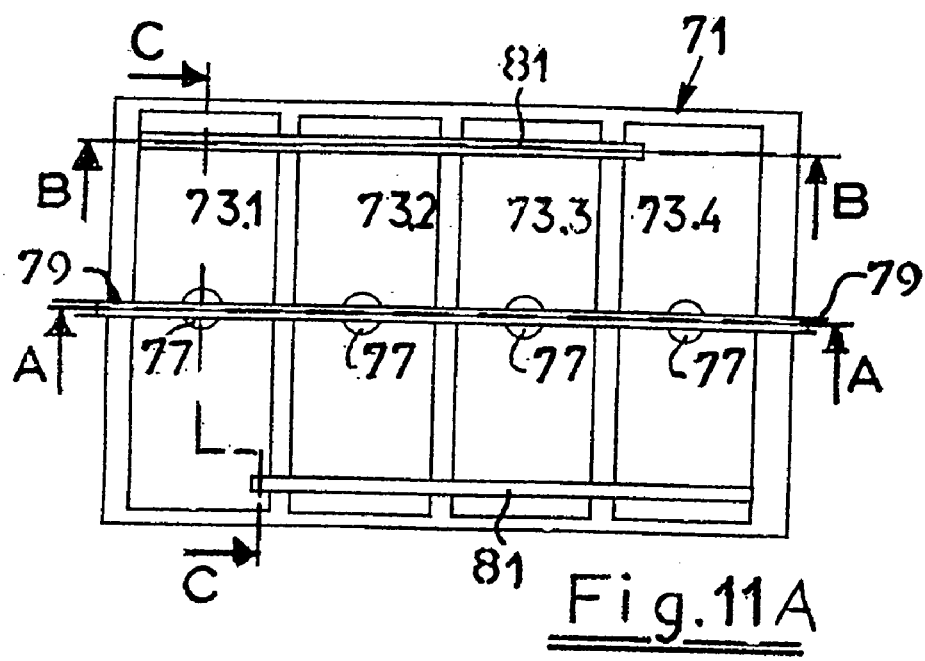
FIG. 11A is a diagrammatic plan view of a capacitor column with a subdivided ground electrode using thick-film technology.
Figure 11B:
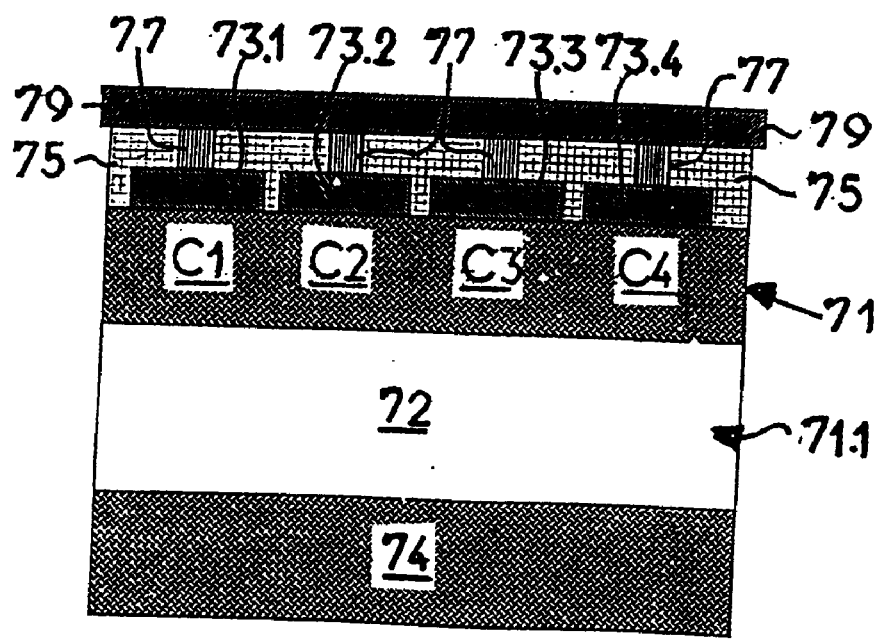
FIG. 11B is a diagrammatic, longitudinal sectional view of the capacitor column along section line A—A in FIG. 11A.

FIG. 11A shows a compact capacitor column 71 having a central channel 71.1 and having capacitor elements C1, C2, C3 and C4, which allows production using the known thick-film technology. This capacitor column 71 is formed by a body composed of a dielectric material 74 having a high dielectric constant, which has a central channel 71.1 for the signal conductor (not shown) which—as already described—either itself forms the signal electrode of the capacitor or is connected to a metallic coating 72, which forms the signal electrode, on the wall of the central channel 71.1. The ground electrode, which is subdivided into electrode elements 73.1, 73.2, 73.3 and 73.4, is applied to the outside of the body, directly onto the material having a high dielectric constant (only one is shown, illustrated in bold). In this case, it is self-evident that the signal conductor may also be in the form of a conductor track, with the central channel 71.1 forming a groove accommodating this conductor track. Each of these ground electrode elements is connected via a ground connecting conductor 77 to the ground dissipation conductor 79, with the capacitances of the capacitor elements C1, C2, C3 and C4 being connected in parallel and forming the filter capacitances. These metallic connectors are formed by metallic connecting compounds being introduced into open channels in the insulating layer 75, which make the contact. To this end, these insulating layers are advantageously applied using the screen-printing method, with the open channels remaining as "unprinted points". It is advantageous to apply a solder paste as a metallic compound, which penetrates into each of the open channels, and which is heated to solder the electrode element and ground dissipation conductor.

The electrode elements 73.1, 73.2, 73.3 and 73.4 are covered by an insulating layer 75 which has a low dielectric constant in the region of $10^0$, and in which the connecting conductors 77 run. The ground dissipation conductor 79 passes through this insulating layer 75 at a distance from the metallic coatings which form the electrode elements 73.1, 73.2, 73.3 and 73.4 and thus also at a distance from the dielectric 74 having a high dielectric constant, so that signal propagation is not adversely affected by the influence of a high dielectric constant.

The electrode elements 73.1, 73.2, 73.3 and 73.4 are advantageously coupled in their sequence via resistors. To this end, these electrode elements are covered by an insulating layer 75 having a low dielectric constant, which has a contact area left free for each of the connected electrode elements. A resistance strip 81 is applied to this insulating layer 75, and is electrically connected to the respective electrode element through these contact areas which have been left free. These strip parts with which contact is made in this way form the resistor elements R1, R2 and R3 (FIG. 4E) which bridge the electrode elements 73.1, 73.2, 73.3 and 73.4 like a series circuit. Both the ground dissipation conductor 79 and the resistors are in this case shown as conductor tracks on edge although it is self-evident that they may also be protected by an embedding compound, or these conductor tracks may also be formed as flat-lying conductor tracks. An insulating varnish cover, protecting this configuration, may be provided.

Figure 11C:
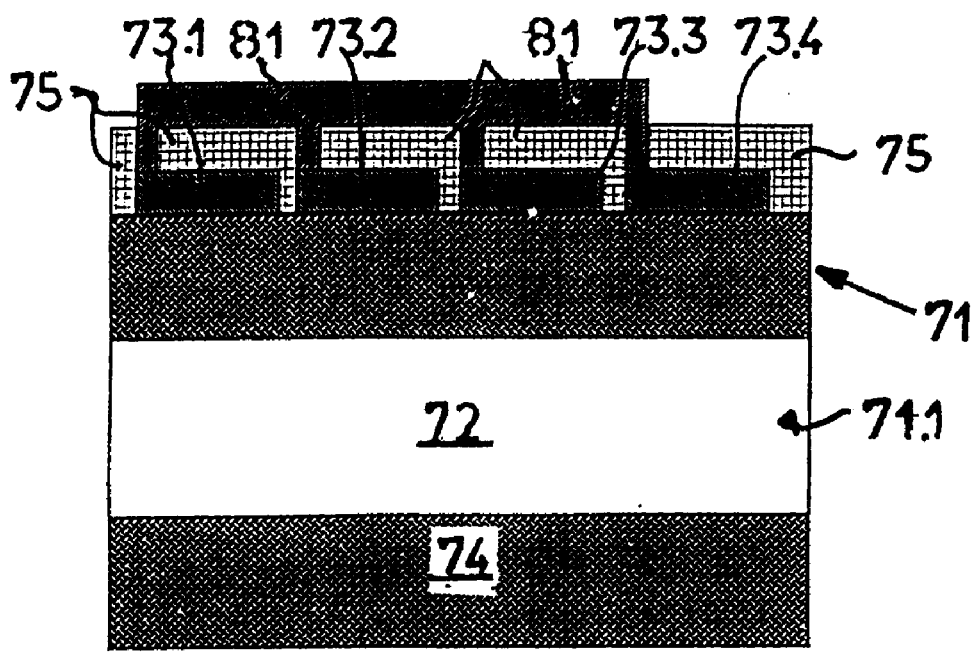
FIG. 11C is a diagrammatic, longitudinal sectional view of the capacitor column along section line B—B in FIG. 11A.
Figure 11D:
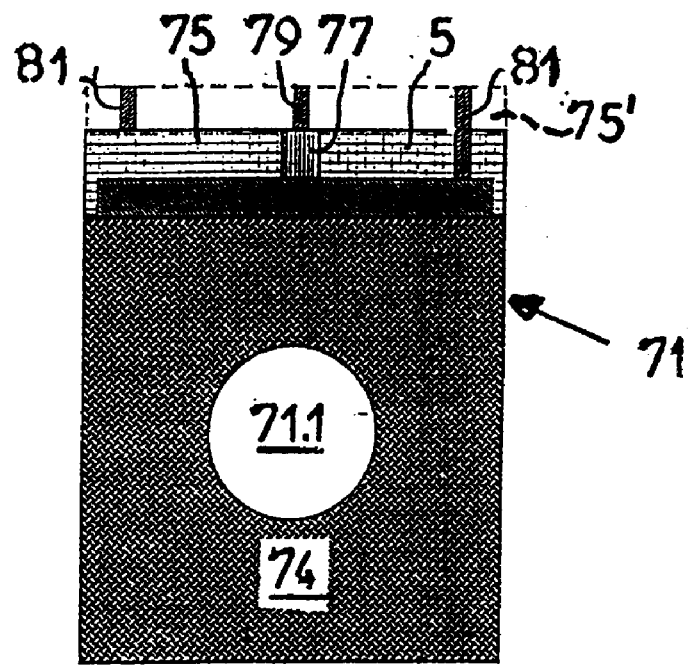
FIG. 11D is a diagrammatic sectional view of the capacitor column along section line C—C in FIG. 11A.
Figure 12A:
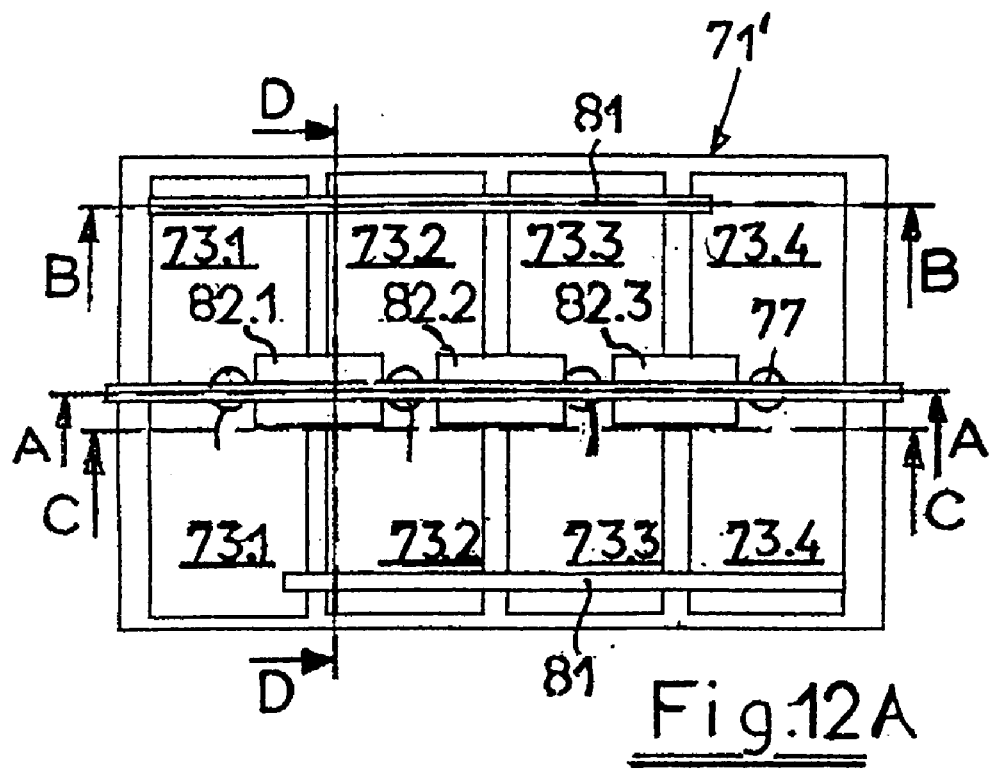
FIG. 12A is a diagrammatic top plan view of a capacitor column with a subdivided ground electrode using thick-film technology and series-path inductances in a ground dissipation line.
Figure 12B:
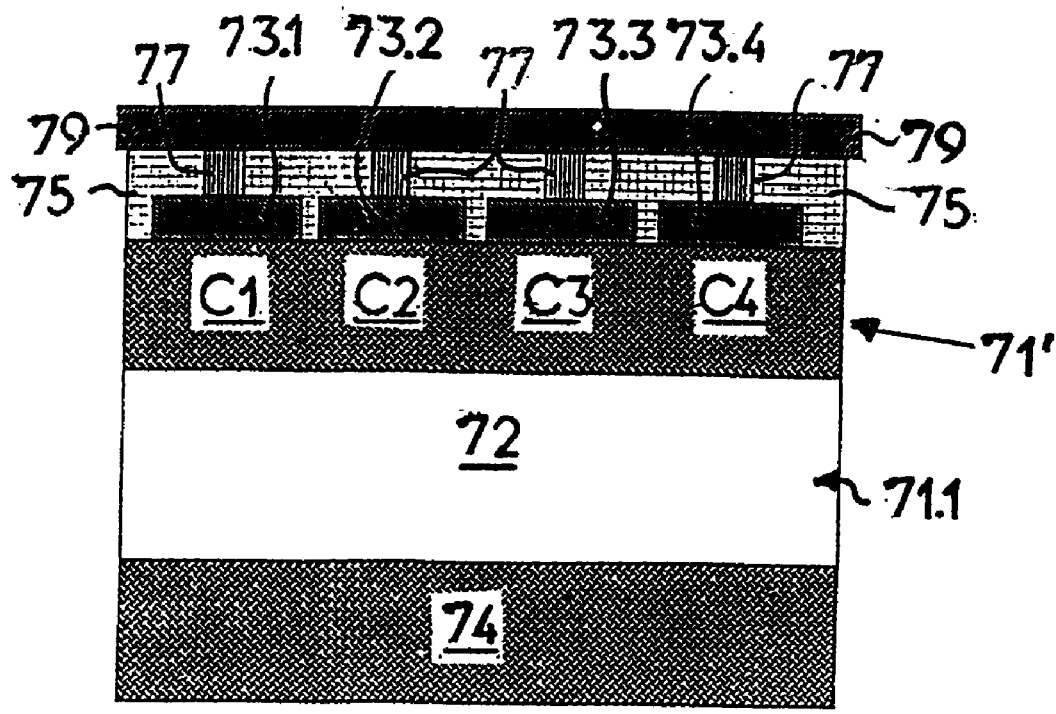
FIG. 12B is a diagrammatic, longitudinal sectional view of the capacitor column along section line A—A in FIG. 12A.
Figure 12C:
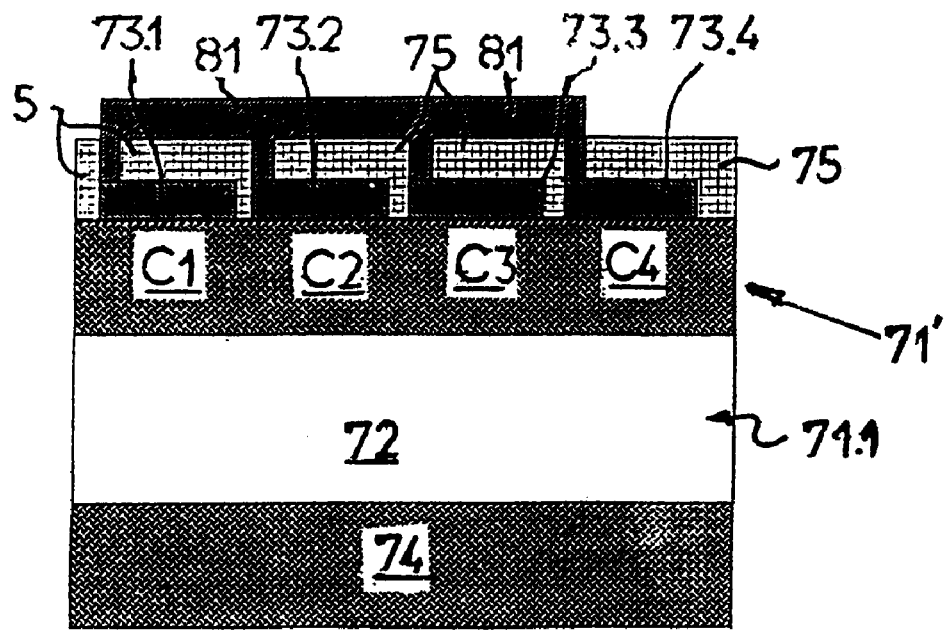
FIG. 12C is a diagrammatic, longitudinal sectional view of the capacitor column along section line B—B in FIG. 12A.
Figure 12D:
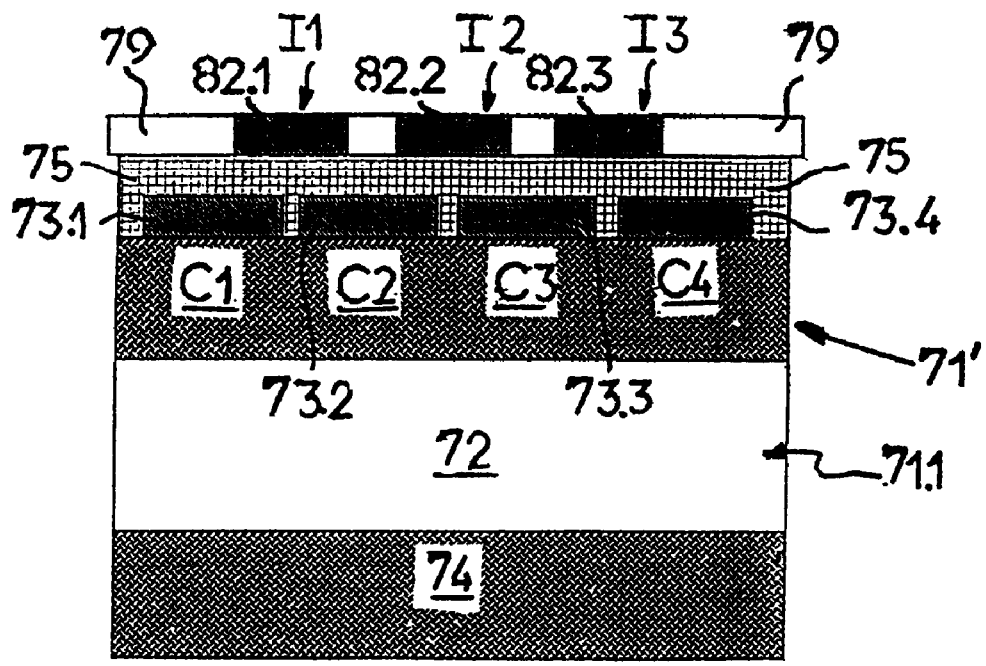
FIG. 12D is a diagrammatic, longitudinal sectional view of the capacitor column along section line C—C in FIG. 12A.
Figure 12E:
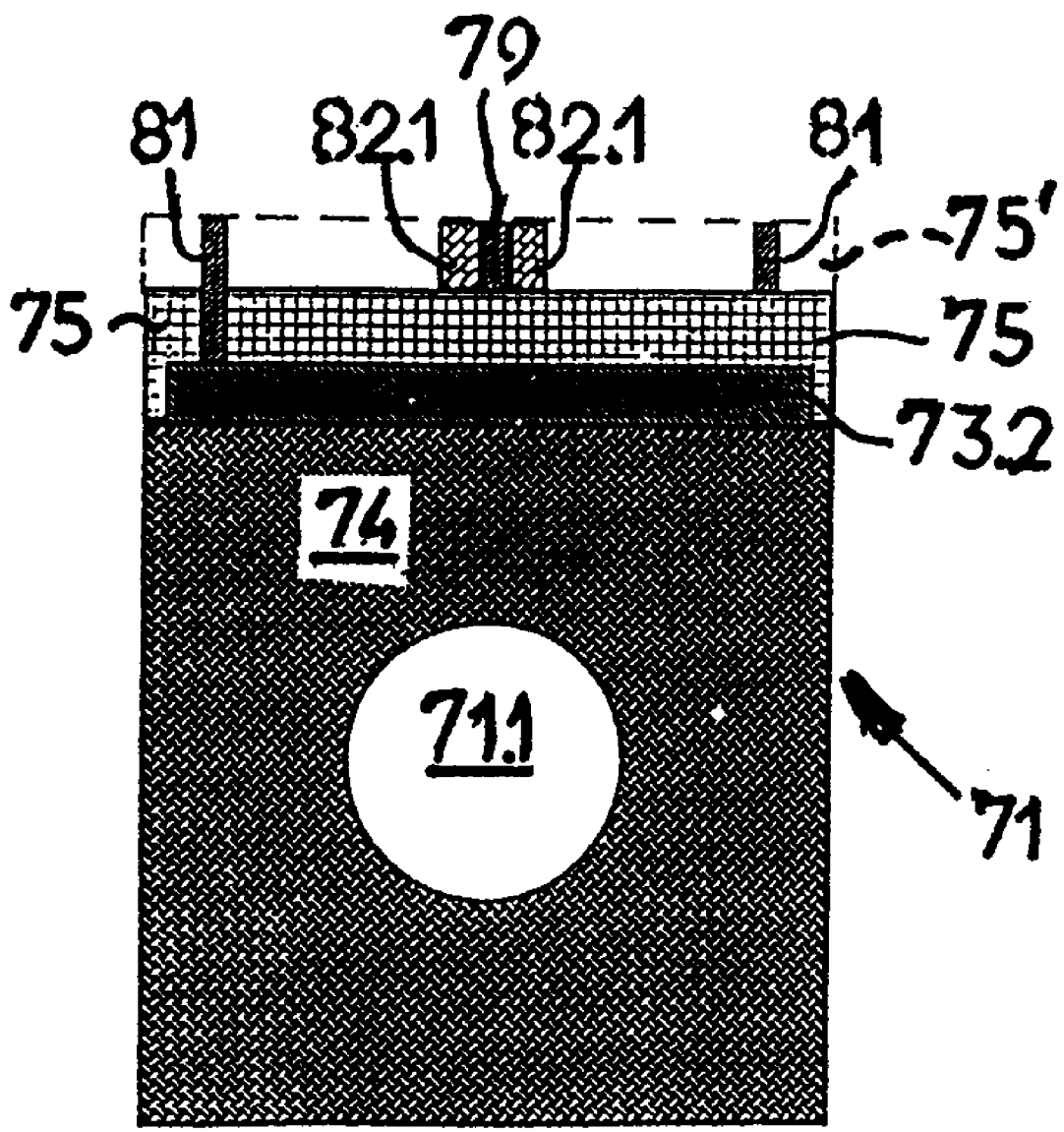
FIG. 12E is a diagrammatic cross-sectional view of the capacitor column along section line D—D in FIG. 12A.

FIGS. 12A–12E show an embodiment of the capacitor column 71' corresponding to the illustration in the FIGS. 11A–11D, but with series-path inductances I1, I2, I3 (see FIGS. 4D, 4E) in the ground conductor 79, which can be produced through the use of ferritic layers 82.1, 82.2 and 82.3 using known thick-film technology. A plan view of this capacitor column 71' is shown in FIG. 12A. A central longitudinal section, along the section line A—A of FIG. 12A, is shown in FIG. 12B. A longitudinal section, along the section line B—B of FIG. 12A, is shown in FIG. 12C. A longitudinal section along the section line C—C of FIG. 12A, such that the ferritic coatings can be seen is shown in FIG. 12D. A cross section, along the section line D—D of FIG. 12A, is shown in FIG. 12E. Between the connections of the ground connecting conductors 77, the ground dissipation conductor 79 is in each case provided with a ferritic layer 82.1, 82.2 or 82.3, at both ends. These ferritic layers give the corresponding section of the ground conductor 79 the characteristic of a series-path inductance. These series-path inductances I1, I2 and I3 (FIG. 4E), once again with inductance values in the range from 1 to 10 $\mu$H, represent in conjunction with the capacitances of the capacitor elements C1, C2, C3 and C4 series-connected Pi filters, which govern the filter characteristics of the overall filter. In this case, series-path inductances formed in the same way can also be provided in the input and in the output of the filter (see FIGS. 10A–10C), with the number of electrode elements not being limited to four, and the number of resistor elements not being limited to three.

It is clear that the conductors—the ground dissipation conductor 69 or 79 or the resistance conductor—shown as strips on edge here—can be embedded in an encapsulation compound, sealing the block, as indicated by dashed lines by the reference symbol 75' in FIG. 11C or 12E.

We claim:

1. A multiple filter, comprising:
   a cuboid block made of an insulating material and having an exterior region;
   said cuboid block being formed with a number of passages to be assigned to a corresponding number of signal conductors;
   at least one capacitor being respectively assigned to each of at least some of said passages;
   said at least one capacitor having a signal electrode and a ground electrode and a dielectric layer provided therebetween;
   said signal electrode being electrically connected to an associated one of the signal conductors;
   a ground conductor connectable to ground;
   said dielectric layer including a dielectric with a dielectric constant in an order of magnitude of $10^3$ to $10^4$, said dielectric being formed of said insulating material;
   said at least one capacitor being in a form of a capacitor column;
   said capacitor column being provided in said cuboid block and being surrounded by said cuboid block, said capacitor column being formed with a central channel and having an outer wall, said central channel forming one of said passages;
   said signal electrode of said at least one capacitor being formed in said central channel; and
   said ground electrode being provided in a region of said outer wall of said capacitor column, said ground electrode being a metal layer at least partially covering said outer wall and being connected to said ground conductor extending transversely to said central channel.

2. The multiple filter according to claim 1, including a metallic coating connected to said central channel, said metallic coating forming said signal electrode.

3. The multiple filter according to claim 1, wherein said ground electrode is a metallization, said metallization surrounds said capacitor column in a manner of a tube.

4. The multiple filter according to claim 3, including a layer of a further dielectric having a further dielectric constant in a range from $10^0$ to $10^1$, said further dielectric being provided as a spacer between said metallization and said dieletric.

5. The multiple filter according to claim 1, wherein:
   said cuboid block is formed with grooves, said grooves have respective bases; and
   ground conductors are provided in said bases of said grooves.

6. The multiple filter according to claim 1, wherein:
   an associated one of the signal conductors is provided at a distance from said signal electrode and thus from said dielectric;
   said signal electrode is subdivided into at least two electrode elements separated in a direction of a signal propagation; and
   said electrode elements are electrically connected, via at least one signal connecting conductor, with the associated one of the signal conductors such that said at least one capacitor is formed from capacitor elements and includes a continuous electrode and a subdivided electrode.

7. The multiple filter according to claim 6, wherein:
   said at least one signal connecting conductor and said associated one of said signal conductors are connected by an essentially point-shaped connection; and
   a further dielectric having a further dielectric constant in a range from $10^0$ to $10^1$ is provided between the associated one of the signal conductors and said signal electrode.

8. The multiple filter according to claim 6, including electronic components connecting said subdivided and mutually insulated electrode elements in series.

9. The multiple filter according to claim 8, wherein said electronic components are resistance elements with resistance values in a range of a characteristic impedance of the associated one of the signal conductors interacting with said dielectric.

10. The multiple filter according to claim 9, wherein said resistance elements are ohmic resistance elements.

11. The multiple filter according to claim 8, wherein said electronic components are ohmic resistance elements.

12. The multiple filter according to claim 6, including soldered SMD components as resistors for connecting adjacent ones of said electrode elements in series.

13. The multiple filter according to claim 6, including applied strips of resistance paste connecting adjacent ones of said electrode elements in series.

14. The multiple filter according to claim 6, including resistance strips, applied with planar technology, said resistance strips connecting adjacent ones of said electrode elements in series.

15. The multiple filter according to claim 1, wherein:
said ground conductor is provided at a distance from said ground electrode and thus from said dielectric;
said ground electrode is subdivided into at least two electrode elements separated in a direction of a signal propagation; and
said electrode elements are electrically connected, via at least one ground connecting conductor, with said ground conductor such that said at least one capacitor is formed from capacitor elements and includes a continuous electrode and a subdivided electrode.

16. The multiple filter according to claim 15, wherein:
said ground connecting conductor and said ground conductor are connected by an essentially point-shaped connection; and
a further dielectric having a further dielectric constant in a range from $10^0$ to $10^1$ is provided between said ground conductor and said ground electrode.

17. The multiple filter according to claim 15, including electronic components connecting said subdivided and mutually insulated electrode elements in series.

18. The multiple filter according to claim 17, wherein said electronic components are resistance elements with resistance values in a range of a characteristic impedance of said ground conductor interacting with said dielectric.

19. The multiple filter according to claim 17, wherein said electronic components are ohmic resistance elements.

20. The multiple filter according to claim 15, including soldered SMD components as resistors for connecting adjacent ones of said electrode elements in series.

21. The multiple filter according to claim 15, including resistance strips, applied with planar technology, said resistance strips connecting adjacent ones of said electrode elements in series.

22. The multiple filter according to claim 15, including applied strips of resistance paste connecting adjacent ones of said electrode elements in series.

23. The multiple filter according to claim 1, wherein:
said cuboid block is formed with grooves; and shielding metal strips are introduced in at least some of said grooves and are connected to ground.

24. The multiple filter according to claim 1, wherein said ground conductor is a metallized strip running parallel to said central channel, at a distance from said dielectric having a dielectric constant in a range from $10^3$ to $10^4$.

25. The multiple filter according to claim 1, including an inductance connected to one of said signal conductor and said ground conductor.

26. The multiple filter according to claim 1, wherein one of said signal electrode and said ground electrode is subdivided into electrode elements, an inductance is connected between two successive ones of said electrode elements, said inductance is in a range of from 1 to 10 $\mu$H and is selected from the group consisting of SMD coils, ferrite beads, and ferrite layers.

27. The multiple filter according to claim 1, wherein at least one of said ground conductor, said dielectric, and the signal conductors is a layer applied as a screen-printed layer for forming a planar filter structure.

28. The multiple filter according to claim 1, wherein at least one of said ground conductor, said dielectric, the signal conductors, electrode elements, a resistance, and an inductance is a layer applied as a screen-printed layer for forming a planar filter structure, and wherein said ground conductor is provided in a further dielectric and at a distance from said dielectric, said further dielectric having a further dielectric constant in a range from $10^0$ to $10^1$.

29. The multiple filter according to claim 1, including a plurality of capacitor columns provided in a row and grouped as one of single columns, double columns, triple columns, and multiple columns for forming plug connector inserts, said capacitor columns having respective central channels for the associated signal conductors to pass therethrough, a base for said capacitor columns corresponding to connections to be filtered, and said ground conductor being a metallic coating provided on at least part of outer walls of said capacitor columns.

30. The multiple filter according to claim 1, wherein said cuboid block is provided with an external metallization and forms a filter plug with a housing.

31. A multiple filter, comprising:
a cuboid block made of an insulating material and having a base and an exterior region;
said cuboid block being formed with a number of passages to be assigned to a corresponding number of signal conductors;
capacitors being respectively assigned to each of at least some of said passages;
said capacitors each having a signal electrode and a ground electrode and a dielectric layer provided therebetween;
said signal electrode being electrically connected to an associated one of the signal conductors;
a ground conductor connectable to ground;
said dielectric layer including a dielectric with a dielectric constant in an order of magnitude of $10^3$ to $10^4$, said dielectric being formed of said insulating material;
said capacitors being in a form of capacitor columns and having feet;
said capacitor columns standing with said feet on said base of said cuboid block and being separated as islands at least by transverse grooves formed in said cuboid block;
said capacitor columns each being formed with a central channel having an inner wall, and said capacitor columns each having an outer wall, said central channel forming one of said passages;
said signal electrode being provided in a region of said inner wall; and
said ground electrode being provided in a region of said outer wall, said ground electrode being a metal layer at least partially covering said outer wall and being connected to said ground conductor extending transversely to said central channel.

32. The multiple filter according to claim 31, wherein said capacitor columns are provided in multiple rows and are further separated by longitudinal grooves formed in said cuboid block.

33. The multiple filter according to claim 31, wherein one of the signal conductors forms said signal electrode.

34. The multiple filter according to claim 31, wherein said signal electrode is a metal coating connected to one of the signal conductors.

35. The multiple filter according to claim 31, including a metallic coating connected to said central channel, said metallic coating forms said signal electrode.

36. The multiple filter according to claim 31, wherein said ground electrode is a metallization, said metallization surrounds said capacitor columns in a manner of a tube.

37. The multiple filter according to claim 36, including a layer of a further dielectric having a further dielectric constant in a range from $10^0$ to $10^1$, said further dielectric being provided as a spacer between said metallization and said dielectric.

38. The multiple filter according to claim 31, wherein:
said cuboid block is formed with grooves, said grooves have respective bases; and
ground conductors are provided in said bases of said grooves.

39. The multiple filter according to claim 31, wherein:
an associated one of the signal conductors is provided at a distance from said signal electrode and thus from said dielectric;
said signal electrode is subdivided into at least two electrode elements separated in a direction of a signal propagation; and
said electrode elements are electrically connected, via at least one signal connecting conductor, with the associated one of the signal conductors such that said capacitors are formed from capacitor elements and include a continuous electrode and a subdivided electrode.

40. The multiple filter according to claim 39, wherein:
said signal connecting conductor and said associated one of said signal conductors are connected by an essentially point-shaped connection; and
a further dielectric having a further dielectric constant in a range from $10^0$ to $10^1$ is provided between the associated one of the signal conductors and said signal electrode.

41. The multiple filter according to claim 39, including electronic components connecting said subdivided and mutually insulated electrode elements in series.

42. The multiple filter according to claim 41, wherein said electronic components are resistance elements with resistance values in a range of a characteristic impedance of the associated one of the signal conductors interacting with said dielectric.

43. The multiple filter according to claim 42, wherein said resistance elements are ohmic resistance elements.

44. The multiple filter according to claim 41, wherein said electronic components are ohmic resistance elements.

45. The multiple filter according to claim 39, including soldered SMD components as resistors for connecting adjacent ones of said electrode elements in series.

46. The multiple filter according to claim 39, including applied strips of resistance paste connecting adjacent ones of said electrode elements in series.

47. The multiple filter according to claim 39, including resistance strips, applied with planar technology, said resistance strips connecting adjacent ones of said electrode elements in series.

48. The multiple filter according to claim 31, wherein:
said cuboid block is formed with grooves; and
shielding metal strips are introduced in at least some of said grooves and are connected to ground.

49. The multiple filter according to claim 31, wherein:
said ground conductor is provided at a distance from said ground electrode and thus from said dielectric;
said ground electrode is subdivided into at least two electrode elements separated in a direction of a signal propagation; and
said electrode elements are electrically connected, via at least one ground connecting conductor, with said ground conductor such that said capacitors are formed from capacitor elements and include a continuous electrode and a subdivided electrode.

50. The multiple filter according to claim 49, wherein:
said at least one ground connecting conductor and said ground conductor are connected by an essentially point-shaped connection; and
a further dielectric having a further dielectric constant in a range from $10^0$ to $10^1$ is provided between said ground conductor and said ground electrode.

51. The multiple filter according to claim 49, including resistance strips, applied with planar technology, said resistance strips connecting adjacent ones of said electrode elements in series.

52. The multiple filter according to claim 49, including applied strips of resistance paste connecting adjacent ones of said electrode elements in series.

53. The multiple filter according to claim 49, including soldered SMD components as resistors for connecting adjacent ones of said electrode elements in series.

54. The multiple filter according to claim 49, including electronic components connecting said subdivided and mutually insulated electrode elements in series.

55. The multiple filter according to claim 54, wherein said electronic components are resistance elements with resistance values in a range of a characteristic impedance of said ground conductor interacting with said dielectric.

56. The multiple filter according to claim 54, wherein said electronic components are ohmic resistance elements.

57. The multiple filter according to claim 31, wherein said ground conductor is a metallized strip running parallel to said central channel, at a distance from said dielectric having a dielectric constant in a range from $10^3$ to $10^4$.

58. The multiple filter according to claim 31, including an inductance connected to one of said signal conductor and said ground conductor.

59. The multiple filter according to claim 31, wherein one of said signal electrode and said ground electrode is subdivided into electrode elements, an inductance is connected between two successive ones of said electrode elements, said inductance is in a range of from 1 to 10 $\mu$H and is selected from the group consisting of SMD coils, ferrite beads, and ferrite layers.

60. The multiple filter according to claim 31, wherein at least one of said ground conductor, said dielectric, and the signal conductors is a layer applied as a screen-printed layer for forming a planar filter structure.

61. The multiple filter according to claim 31, wherein at least one of said ground conductor, said dielectric, the signal conductors, electrode elements, a resistance, and an inductance is a layer applied as a screen-printed layer for forming a planar filter structure, and wherein said ground conductor is provided in a further dielectric and at a distance from said dielectric, said further dielectric having a further dielectric constant in a range from $10^0$ to $10^1$.

62. The multiple filter according to claim 31, wherein said capacitor columns are provided in a row and grouped as one of single columns, double columns, triple columns, and multiple columns for forming plug connector inserts, said capacitor columns having respective central channels for the associated signal conductors to pass therethrough, a base for said capacitor columns corresponding to connections to be filtered, and said ground conductor being a metallic coating provided on at least part of outer walls of said capacitor columns.

63. The multiple filter according to claim 31, wherein said cuboid block is provided with an external metallization and forms a filter plug with a housing.

64. In combination with a multipole plug connector, a multiple filter, comprising:

a cuboid block made of an insulating material and having an exterior region;

said cuboid block being formed with a number of passages to be assigned to a corresponding number of signal conductors;

at least one capacitor being respectively assigned to each of at least some of said passages;

said at least one capacitor having a signal electrode and a ground electrode and a dielectric layer provided therebetween;

said signal electrode being electrically connected to an associated one of the signal conductors;

a ground conductor connectable to ground;

said dielectric layer including a dielectric with a dielectric constant in an order of magnitude of $10^3$ to $10^4$, said dielectric being formed of said insulating material;

said at least one capacitor being in a form of a capacitor column;

said capacitor column being provided in said cuboid block and being surrounded by said cuboid block, said capacitor column being formed with a central channel and having an outer wall, said central channel forming one of said passages;

said signal electrode of said at least one capacitor being formed in said central channel; and said ground electrode being provided in a region of said outer wall of said capacitor column, said ground electrode being a metal layer at least partially covering said outer wall and being connected to said ground conductor extending transversely to said central channel.

65. In combination with a multipole plug connector, a multiple filter, comprising:

a cuboid block made of an insulating material and having a base and an exterior region;

said cuboid block being formed with a number of passages to be assigned to a corresponding number of signal conductors;

capacitors being respectively assigned to each of at least some of said passages;

said capacitors each having a signal electrode and a ground electrode and a dielectric layer provided therebetween;

said signal electrode being electrically connected to an associated one of the signal conductors;

a ground conductor connectable to ground;

said dielectric layer including a dielectric with a dielectric constant in an order of magnitude of $10^3$ to $10^4$, said dielectric being formed of said insulating material;

said capacitors being in a form of capacitor columns and having feet;

said capacitor columns standing with said feet on said base of said cuboid block and being separated as islands at least by transverse grooves formed in said cuboid block;

said capacitor columns each being formed with a central channel having an inner wall, and said capacitor columns each having an outer wall, said central channel forming one of said passages;

said signal electrode being provided in a region of said inner wall; and said ground electrode being provided in a region of said outer wall, said ground electrode being a metal layer at least partially covering said outer wall and being connected to said ground conductor extending transversely to said central channel.

* * * * *